US012657309B2

(12) United States Patent
Alimian et al.

(10) Patent No.: US 12,657,309 B2
(45) Date of Patent: Jun. 16, 2026

(54) DELIVERING AUGMENTED THREAT ASSESSMENT VALUES TO A SECURITY THREAT MANAGEMENT FACILITY

(71) Applicant: Box, Inc., Redwood City, CA (US)

(72) Inventors: Areg Alimian, Woodland Hills, CA (US); Ryan Matthew Knotts, San Jose, CA (US); Kanav Gandhi, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 100 days.

(21) Appl. No.: 18/346,156

(22) Filed: Jun. 30, 2023

(65) Prior Publication Data

US 2024/0111877 A1 Apr. 4, 2024

Related U.S. Application Data

(60) Provisional application No. 63/413,210, filed on Oct. 4, 2022.

(51) Int. Cl.
| | |
|---|---|
| *G06F 21/00* | (2013.01) |
| *G06F 21/57* | (2013.01) |
| *H04L 9/40* | (2022.01) |

(52) U.S. Cl.
CPC ........ G06F 21/577 (2013.01); H04L 63/1425 (2013.01); H04L 63/20 (2013.01); *G06F 2221/034* (2013.01)

(58) Field of Classification Search
CPC ............. G06F 21/577; G06F 2221/034; H04L 63/1425; H04L 63/20
See application file for complete search history.

(56) References Cited

U.S. PATENT DOCUMENTS 10,686,816 B1 * 6/2020 Shintre ............... H04L 63/1425
11,483,386 B1 10/2022 Huang et al.
(Continued)

FOREIGN PATENT DOCUMENTS

EP 3854047 B1 * 3/2024 ........... G06F 21/316

OTHER PUBLICATIONS

Crowdstrike, 2023 Global Threat Report, dated 2023.
(Continued)

*Primary Examiner* — Tri M Tran
(74) *Attorney, Agent, or Firm* — Vista IP Law Group, LLP

(57) ABSTRACT

Methods, systems, and computer program products for content management systems. Multiple components are operatively interconnected to carry out operations for content management systems. A security threat management facility (STMF) is identified. The STMF contains a database of threat assessment values in addition to further information pertaining to one or more users. Concurrent with operation of the STMF, a content management system (CMS) tracks user-initiated content object interaction events. Based on analysis of the tracked user-initiated content object interaction events, a further threat assessment value is generated by the CMS. Such a further threat assessment is determined based on one or more user-to-user relationships or one or more user-to-file relationships as determined at the content management system. An augmented threat assessment is formed using both the threat assessment values of the STMF with the further threat assessment value from the CMS. The augmented threat assessment is then provided to the STMF.

20 Claims, 14 Drawing Sheets

(56)          References Cited

U.S. PATENT DOCUMENTS

| 2010/0063868 A1 | 3/2010 | Bird et al. |
| 2016/0191465 A1 | 6/2016 | Thomas et al. |
| 2020/0089892 A1 | 3/2020 | Ojha |
| 2024/0111877 A1 | 4/2024 | Ian et al. |
| 2024/0114056 A1 | 4/2024 | Alim et al. |

OTHER PUBLICATIONS

Kaspersky, "Machine Learning for Malware Detection", Date retrieved from google, Nov. 17, 2017.
Kulkarni, "Taking Security to the Next Level: CrowdStrike Now Analyzes over 100 Billion Events Per Day", Crowdstrike Blog, dated May 23, 2018.
Box Support, Introducing modifiable retention policies in Box Governance !. dated Jul. 14, 2022.
Box, The Content Cloud, Secure content management and collaboration, date found via Internet Archive as Feb. 2, 2023.
Foxit (When it Makes Sense to Watermark Your PDF Documents, May 31, 2019, 3 pages) (Year: 2019).
Non-Final Office Action dated Mar. 14, 2025 for related U.S. Appl. No. 18/346,137.
Final Office Action dated Jul. 3, 2025 for related U.S. Appl. No. 18/346,137.
Notice of Allowance date Sep. 23, 2025 for related U.S. Appl. No. 18/346,137.
Notice of Allowance dated Jan. 28, 2026 for related U.S. Appl. No. 18/346,137.

* cited by examiner

1B00

First Perimeter 108

Non-content based Vulnerabilities Graph 110

Content-based Vulnerabilities Graph 112

Second Perimeter 114

Projector/Combiner Module 115

Normalized Security Perimeter 118

Security Policies

120
Compare the normalized security perimeter to security policies

121
Evaluate options

Allow

Deny

Remediate

1D00

121

Event Stream 168

From CMS
- Content Sensitivity Level 170
- Subject Content Object Metadata 193
- Device Characteristics 191

From STMF
- Network Characteristics 192
- Third Party Security Risks
  - Malware risks 194
  - Endpoint risks 189
  - User-specific risks 186
  - Device-specific risks 199

Knowledge-based Risk Assessment Module 190

Denial Signals 195

Remediation Signals 196

Allowance Signals 197

Options

New Policies 198
- Observation Agent Code 127
- Exceptions 135
- Activity Enjoinment 137 (e.g., copy/paste)
- Risk Assessment Algorithm 113
- Adaptive Remediation Agent Code 139

Total Risk Value 126

FIG. 1D

4A00

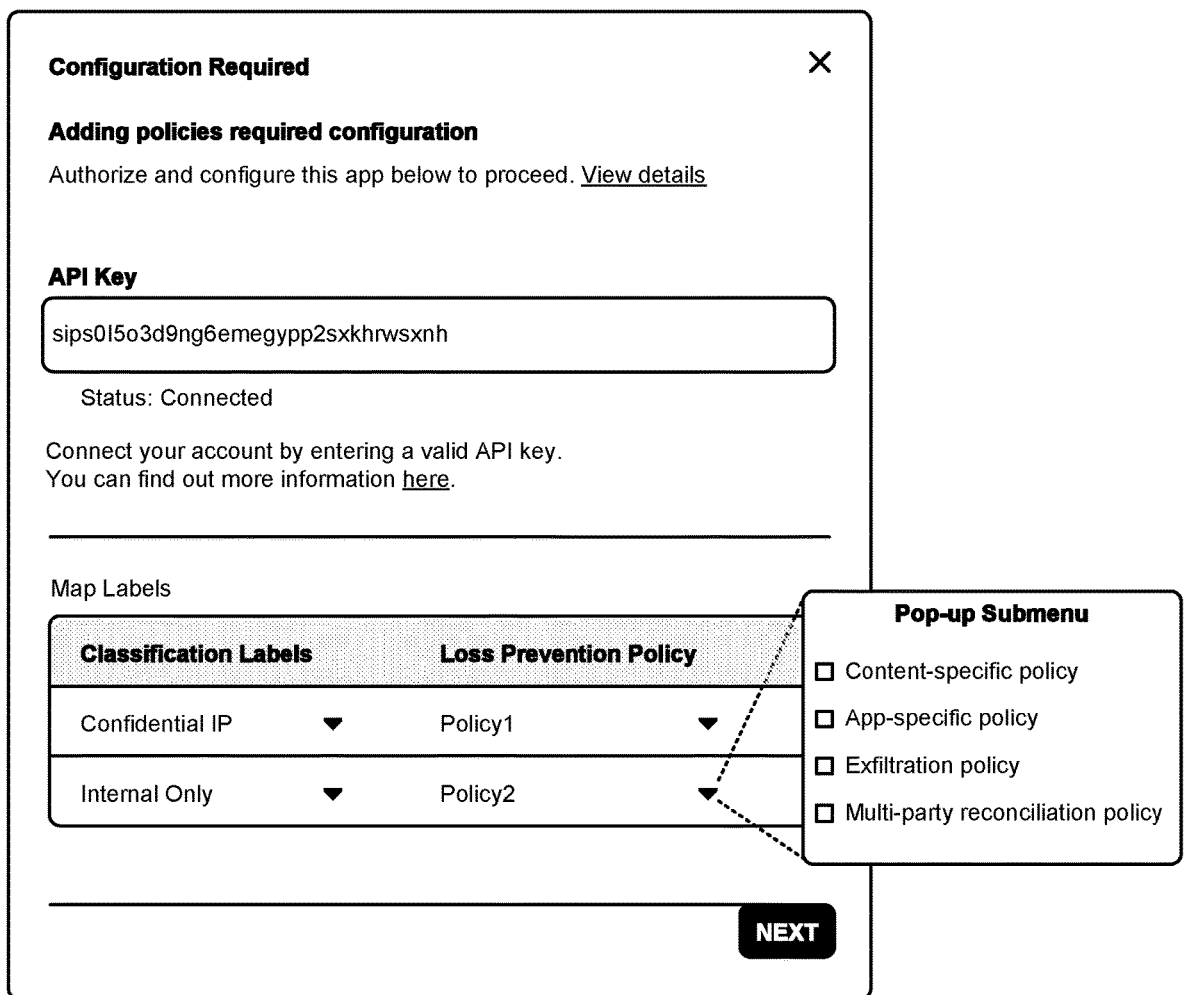

Configuration Required                                    ✕

Adding policies required configuration

Authorize and configure this app below to proceed. <u>View details</u>

API Key sips0l5o3d9ng6emegypp2sxkhrwsxnh

Status: Connected

Connect your account by entering a valid API key.
You can find out more information <u>here</u>.

Map Labels

| Classification Labels | | Loss Prevention Policy | |
|---|---|---|---|
| Confidential IP | ▼ | Policy1 | ▼ |
| Internal Only | ▼ | Policy2 | ▼ |

Pop-up Submenu

☐ Content-specific policy

☐ App-specific policy

☐ Exfiltration policy

☐ Multi-party reconciliation policy

NEXT

Q Settings  Search

Apps & Integrations          Custom Apps Manager          Security Integrations

Security Integrations                                    [ Run Report ]  [ Save ]

Connect App Securely     API Key sips0l5o3d9ng6emegypp2sxkhrwsxnh

Status: Connected

Connect to your enterprise account by entering a valid API key.
You can find out more information here.

Alert Map and Connect     Map Actions
Actions

| Alert Risk Level | Action |
|---|---|
| Low ▼ | Monitor only ▼ |
| Medium ▼ | Restrict uploads/downloads from/to endpoint ▼ |
| High ▼ | Select Action ▼ |
| Add Mapping | |

✓ Select Action
Restrict uploads/downloads from/to endpoint
Log out and target user
Monitor Only

FIG. 4B

DELIVERING AUGMENTED THREAT ASSESSMENT VALUES TO A SECURITY THREAT MANAGEMENT FACILITY

RELATED APPLICATIONS

The present application claims the benefit of priority to U.S. Provisional Patent Application Ser. No. 63/413,210 titled "ZERO TRUST ARCHITECTURES IN CONTENT MANAGEMENT SYSTEMS" filed on Oct. 4, 2022, and the present application is related to co-pending U.S. patent application Ser. No. 18/346,137 titled "DEFINING A SECURITY PERIMETER USING KNOWLEDGE OF USER BEHAVIOR WITHIN A CONTENT MANAGEMENT SYSTEM", filed on even date herewith, both of which are hereby incorporated by reference in their entirety.

TECHNICAL FIELD

This disclosure relates to content management systems, and more particularly to techniques for coordinating security parameters between a third-party security threat management facility and a content management system.

BACKGROUND

Modern computing systems have made it easy for multiple users to collaborate over files. Through deployment of collaboration aids (e.g., notifications) a group of users who work on the same file or sets of files can keep in close contact with each other as collaboration proceeds. These collaboration aids are a boon to groups of users who work together, at least in the sense that when one user accesses (e.g., modifies) a file, the other users who also access that file can be notified, thereby keeping the collaborators abreast of ongoing collaboration.

Historical approaches to defining which users can access files for collaboration have long been known to be either too restrictive/conservative in defining who can share, or too liberal in defining who can share. More recently, collaboration systems have implemented the notion of collaboration groups. Moreover advanced collaboration systems have implemented dynamically-defined collaboration groups, where users are added/deleted to/from a particular collaboration group based on observed user interactions with the collaboration system entities and/or with other users. This automated approach has proven effective in (1) reducing the burden on administrators to define and maintain collaboration groups, and (2) automatically connecting new collaboration group members to the previously existing group members.

We live in a world full of malefactors, and bringing in new members into a collaboration group in an automated manner introduces risk. For example, a collaboration group might include users from multiple different entities (e.g., different enterprises), possibly spanning multiple geographic or security boundaries. This introduces still further risks. In some situations where one or more malefactors are involved, it is at least possible that two or more members of a collaboration group are actually in cahoots—with nefarious plans to exfiltrate sensitive information.

Unfortunately, legacy techniques are deficient when it comes to discriminating between collaborators with good intent and potential malefactors. Further, there are no known methods whereby, upon identifying a malefactor, information about that malefactor can be shared in a manner that sensitizes third-party security systems to the fact that a potential malefactor has been identified.

The problem to be solved is therefore rooted in various technological limitations of legacy approaches. Improved technologies are needed. In particular, improved technologies are needed to address the aforementioned technological limitations of legacy approaches.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, where no single one of said innovative aspects is solely responsible for any particular desirable attribute or end result.

The present disclosure describes techniques used in systems, methods, and computer program products for defining a security perimeter using knowledge of user behavior within a content management system, which techniques advance the relevant technologies to address technological issues with legacy approaches. More specifically, the present disclosure describes techniques used in systems, methods, and in computer program products for defining a security perimeter based on content management system observations of user behavior. Certain embodiments are directed to technological solutions for continuously sharing security knowledge with a security threat management facility based on updated risk assessments by the content management system.

The disclosed embodiments modify and improve beyond legacy approaches. In particular, the herein-disclosed techniques provide technical solutions that address the technical problems attendant to failure of security threat management facilities to consider user behavior with respect to actual content. Moreover, the herein-disclosed techniques provide technical solutions that address the technical problems of sharing findings of a content management system (e.g., known or predicted threats) with a security threat management facility. Such technical solutions involve specific implementations (e.g., data organization, data communication paths, module-to-module interrelationships, etc.) that relate to the software arts for improving computer functionality.

The ordered combination of steps of the embodiments serve in the context of practical applications that perform steps for continuously updating content object-specific risk assessments. As such, techniques for continuously updating and sharing content object-specific risk assessments overcome long-standing yet heretofore unsolved technological problems associated with failure of security threat management facilities to consider user behavior with respect to actual content.

Many of the herein-disclosed embodiments for continuously updating content object-specific risk assessments are technological solutions pertaining to technological problems that arise in the hardware and software arts that underlie collaboration systems. Aspects of the present disclosure achieve performance and other improvements in peripheral technical fields including, but not limited to dynamic security risk assessment and security policy codification.

Some embodiments include a sequence of instructions that are stored on a non-transitory computer readable medium. Such a sequence of instructions, when stored in memory and executed by one or more processors, causes the one or more processors to perform a set of acts for continuously updating content object-specific risk assessments.

Some embodiments include the aforementioned sequence of instructions that are stored in a memory, which memory is interfaced to one or more processors such that the one or more processors can execute the sequence of instructions to cause the one or more processors to implement acts for continuously updating content object-specific risk assessments.

In various embodiments, any combinations of any of the above can be organized to perform any variation of acts for defining a security perimeter based on content management system observations of user behavior, and many such combinations of aspects of the above elements are contemplated.

Further details of aspects, objectives and advantages of the technological embodiments are described herein and in the figures and claims.

BRIEF DESCRIPTION OF THE DRAWINGS

The drawings described below are for illustration purposes only. The drawings are not intended to limit the scope of the present disclosure.

FIG. 1D exemplifies a dynamic risk assessment technique including incorporation of threat assessments provided by a third-party security threat management facility, according to an embodiment.

FIG. 4A depicts an example threat policy configuration user interface as used in systems that define security perimeters based on content management system observations of user behavior, according to an embodiment.

FIG. 4B depicts an example threat impact mitigation action mapping technique, according to an embodiment.

DETAILED DESCRIPTION

Figure 1A:
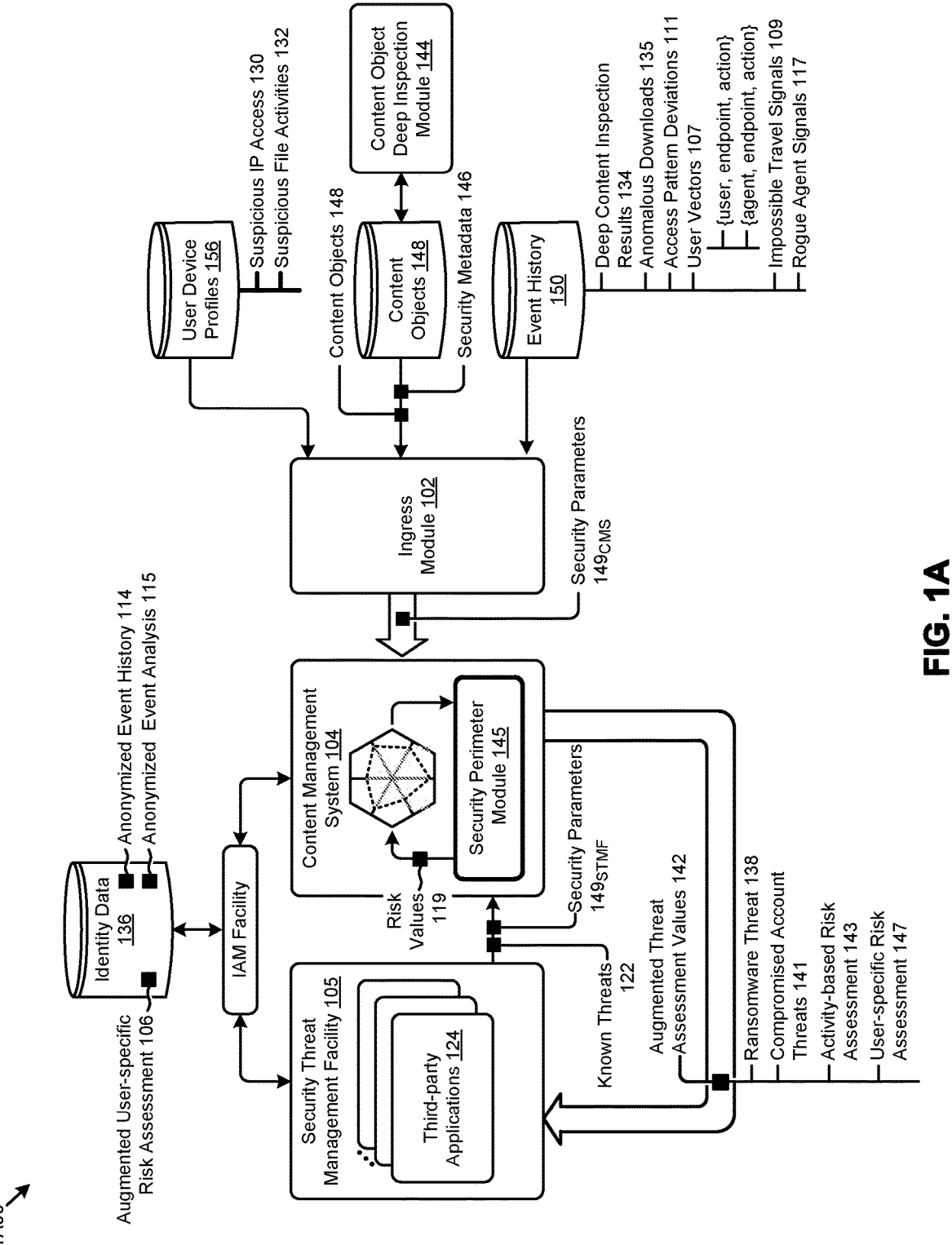
FIG. 1A exemplifies an environment in which various techniques for defining a security perimeter based on content management system observations of user behavior as disclosed herein can be practiced, according to an embodiment.

Aspects of the present disclosure solve problems associated with using computer systems for failure of security threat management facilities to consider user behavior with respect to actual content. These problems are unique to, and may have been created by, various computer-implemented methods for failure of security threat management facilities to consider user behavior with respect to actual content in the context of collaboration systems. Some embodiments are directed to approaches for continuously updating content object-specific risk assessments. The accompanying figures and discussions herein present example environments, systems, methods, and computer program products for defining a security perimeter based on content management system observations of user behavior.

Overview

With every passing day comes news of computer hacking, intellectual property theft, denials of service, and general mayhem in cyberspace. A sort of cat-and-mouse game between malefactors and those who seek to protect computer systems from malicious acts has been playing out since the earlies days of computers. An entire industry has been formed around protecting computer systems from malfeasance. These days, virus checkers have become commonplace, many cloaking strategies used by malefactors have been thwarted, and ransomware attacks are quickly detected and quenched. Nevertheless malaprops continue to reap mayhem using ever more and more sophisticated techniques.

Certain antidotes to such malfeasance have relied on having virus and other malware detection software running on literally millions or billions of computers worldwide. While this is at least hypothetically helpful in quickly identifying the occurrence of breaches, viruses, ransomware and other malware, this technique has proved to be insufficient. This is because generally, such identification comes too late, that is, breaches, viruses, ransomware and other forms of malware are identified only after there has already been some occurrence of some malfeasance. What is needed is a way to gauge the likelihood that some sort of security breach or other malfeasance is incipient. Moreover, what is needed is a way to share the existence of security vulnerabilities and as well as the likelihood of a breach such that remediation can take place before incurring a security risk or a security breach, and/or remediating before incurring the effects of other forms of malfeasance.

Disclosed herein are techniques for collecting, analyzing, and sharing data such that the likelihood of some sort of security breach or other malfeasance can be known and widely shared in advance of such a security breach or other malfeasance. Some of such techniques are implemented in or interfaced with a content management system. Data captured by a content management system can span a long period of time (e.g., years or decades), and can be specific to a particular user and/or his/her collaborators. Such data can be analyzed with respect to calculating a security threat risk assessment value. Strictly as one example, consider a content management system that hosts trade secret information that is accessible by only those who have a bona fide need to know. Historically, those who have a bona fide need to know have been vetted and are beyond reproach. However, recent security breaches (e.g., resulting in 'leaks') have been perpetrated by exactly those persons who had been deemed to be beyond reproach.

Unlike the types of data that is collected from widely-deployed virus checkers and other desktop computer system agents, the types of data collected by content management systems goes far beyond the frontier of data that is collected by such widely-deployed virus checkers and other desktop computer system agents. To illustrate, consider that each time a user device accesses a particular content object (e.g., file) of the content management system, an enormous amount of information is known at that moment.

For example, far beyond merely pairing the user device action (e.g., preview, READ, WRITE, download, etc.) with one or more content objects, the data available at that moment in time (e.g., in a MICROSOFT™ active directory domain service) includes a log of historical accesses to content objects by time and type of access and/or activity (e.g., create collab, add collab, remove collab, apply a security watermark), a log of historical accesses by collaborators, changes in security classifications of certain content objects, occurrences and location of personally identifiable information embedded in the bits of the content objects, the identity of the user associated with the user device, the role of said user in his/her enterprise (e.g., the user's title, department affiliation, etc.), the user's period of employment, the user's planned retirement date or the user's resignation date, the user's scheduled termination date, various security classifications of respective content objects, a precalculated risk tolerance value pertaining to a particular content object, the user's overall relationship with the full set of content objects of the content management system, the user's overall relationships (e.g., via collabs and/or exceptions) with other users of the content management system, and so on.

Some or all of this data can be used to define a machine learning model, specifically a predictive model where some set of incoming signals (e.g., versions or derivations of the aforementioned content management system data) is trained to generate outputs in the form of calculated risk values. Take for example, the following fact pattern:

1. A particular employee has a sufficiently high clearance level such that the employee can access the enterprise's trade secrets,
2. The employee has given notice that the employee intends to terminate employment with the enterprise,
3. The particular employee is searching, decrypting, and previewing an uncharacteristically large number of trade secret files, and
4. The particular employee is accessing the content management system from a user device that is connected through an endpoint that is at an unsecured, public facility.

When taken individually, none of the foregoing facts would, by itself, portend malfeasance; however, when taken together, the fact pattern suggests that the risk of malfeasance, specifically, risk of data 'leakage' is very high. Any operational element of the computing ecosystem that can ingest information (e.g., via ingress module 102) such as a risk value pertaining to the existential "risk of malfeasance" and/or a risk value pertaining to the existential "risk of 'leakage'" can and should ingest such risk values. Such operational elements can use the aforementioned risk values in combination with other information so as to calculate a combined risk assessment.

In Internet settings, where multiple computing systems are interconnected by the world wide web, there are often many third-party players who bring to bear risk assessment tools. In some cases, such risk assessment tools have devised ways to get information about the network topology and network endpoints. Many of these third-party players implement crowd sourcing, where any ecosystem participant can provide further additional information pertaining to the network topology, network endpoints, and network activity. In spite of this massive amount of incoming (e.g., 100 billion tracked events per day), none of the aforementioned third parties nor any of the aforementioned ecosystem participants can provide the content-object based information that a content management system can provide. What is needed are techniques for sharing information (e.g., threat vectors) between constituent functions within any threat theatre.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment 1A00 in which various techniques for defining a security perimeter based on content management system observations of user behavior as disclosed herein can be practiced. As an option, one or more variations of environment 100 or any aspect thereof may be implemented in the context of the architecture and functionality of the embodiments described herein and/or in any environment.

The figure is being presented to illustrate an exemplary environment in which operational components might be configured for practicing the herein-disclosed techniques. More particularly, the figure is being shown to illustrate how content management system 104 can be configured to inform a security threat management facility 105 of threat assessment values.

One possible technique for providing threat assessments to a security threat management facility (STMF) involves configuring a CMS to (1) receive threat assessments from an STMF, (2) form its own threat assessments, possibly based in part on threat assessments received from the STMF, and then (3) to send augmented threat assessments to the STMF. In the shown example, CMS 104 ingests known threats 122 as received from or derived from STMF 105. The known threats may derive based on operation of the STMF itself, or the known threats may derive from an identity access management (IAM) facility (e.g., the shown IAM), possibly in conjunction with identity data 136 that is accessed by the IAM facility.

As used herein, an identity access management facility is a framework of processes, policies and technologies that facilitates maintenance and promulgation of electronic identities (e.g., digital identities). Given an IAM framework, information technology (IT) managers can control user access to critical information. Technologies used in or by IAMs include single sign-on technologies, two-factor authentication technologies, multifactor authentication technologies, and privileged access management technologies. These technologies also provide the ability to securely store and share identity data. In some IAM implementations, profile data as well as data governance requirements serve to define the boundaries of data to be shared. IAM systems can be deployed on premises, and/or provided by a third-party vendor (e.g., through a cloud-based subscription model), and/or deployed in a hybrid model involving both on-premises infrastructure in combination with cloud-based infrastructure.

The aforementioned known threats might be received directly from an STMF, or the known threats might be received from an STMF that integrates with one or more third-party applications 124. Regardless of the origin of the foregoing known threats, such known threats, possibly represented in normalized forms (e.g., security parameters $149_{STMF}$), can be combined with other security parameters that derive from and/or are known by the CMS (e.g., security parameters $149_{CMS}$).

The shown CMS is capable of defining and maintaining threat or security parameters. This is because the CMS, in particular security perimeter module 145 of the CMS, is able to ingest and analyze a great deal of information available to the CMS. Strictly to illustrate the wide range of information available to the CMS, which wide range of information can be used to define and maintain threat or security parameters (e.g., suspicious IP Accesses 130 and/or suspicious file activities 132), consider that a CMS, either by virtue of use of its own native mechanisms (e.g., maintenance of user device profiles 156 and maintenance of an event history 150), or by virtue of the CMS's abilities to avail itself of external facilities (e.g., the shown content object deep inspection module 144), can amalgamate security parameters into the form of a security perimeter.

As used herein, a security perimeter is a collection of values that correspond to respective vulnerabilities. The bounds of a security perimeter can be defined by a shape (e.g., a convex shape having a plurality of vertices that in turn correspond to respective risk values 119). Additionally or alternatively, the bounds of a security perimeter can be defined by a surface defined by a plurality of values which in turn correspond to a respective plurality of variables.

As shown, content objects 148 include precalculated instances of security metadata 146. Such security parameters may in turn correspond to the nature and extent of the contents of the content objects themselves. For example, a content object that is marked as "Confidential" or that contains information that is deemed to be sensitive might be associated with a high risk value, whereas a content object that contains non-proprietary information (e.g., a birthday card to the boss) might be associated with a low risk value. The shown content object deep inspection module 144 is configured to be able to identify risk-informing items such as existence of personally identifiable information (PII), existence of an embedded security legend, and/or existence of a security watermark (e.g., "Confidential," "Secret," "Eyes Only," "Export Controlled," references to business transactions, etc.). In some cases, an outboard data processing service (e.g., a third-party service) performs the actual reading and assessment of the nature of the contents of a particular content object.

Further details regarding techniques for quantifying user-to-user relationships can be found in U.S. Pat. No. 10,867,209 titled "COMBINING OUTPUTS OF DATA PROCESSING SERVICES IN A CLOUD-BASED COLLABORATION PLATFORM" issued on Dec. 15, 2020, which is hereby incorporated by reference in its entirety.

The event history may contain any one or more of: a history of operations performed over the content object, and/or a constituent of groups of users who access the content object, and/or results of content object deep inspection, and/or various tracking of events and/or metadata pertaining to behavioral assessments. As shown, the event history 150 includes precalculated behavioral assessments. Event histories comprise computer representations of events as captured and analyzed over any span of time. Moreover the results of analysis might be captured by or associated with the foregoing computer representations of events. Strictly as some examples, event history 150 might include any number of deep content inspection results 134, any number of occurrences of anomalous downloads, and number of occurrences of access pattern deviations 111, and/or any number of user vectors 107. Individual ones of the user vectors in turn might codify a user (e.g., where userID="1234567"), a URL or other indication of an end-point (e.g., "123.345.56.78:3333"), and/or an action (e.g., "PREVIEW") that corresponds to an action of the user via the endpoint. In some cases, a user is not a natural person, but rather an agent (e.g., a computer program that is run in lieu of a person).

Additionally or alternatively, event history 150 might include any of a variety of signals. In the particular environment of FIG. 1A, signals include impossible travel signals 109 and rogue agent signals 117.

Further details regarding techniques forming and using impossible travel signals can be found in U.S. Pat. No. 11,403,413 titled "AVOIDING USER SESSION MIS-CLASSIFICATION USING CONFIGURATION AND ACTIVITY FINGERPRINTS" issued on Aug. 2, 2022, which is hereby incorporated by reference in its entirety.

Further details regarding techniques for forming and using rogue agent signals can be found in U.S. Pat. No. 10,911,539 titled "MANAGING SHARED CONTENT DIRECTORY STRUCTURE METADATA" issued on Feb. 2, 2021, which is hereby incorporated by reference in its entirety.

Once the CMS has calculated at least some risk values 119, the CMS is in a position to be able to send an augmented threat assessment values 142 to the STMF. The act of calculating and sharing an augmented threat assessment advances the art at least inasmuch as an augmented threat assessment combines information from a security threat management facility with information from a content management system, and then provides this combined information with the STMF.

To explain further, since the CMS has a wealth of information available to it—in particular information not available to the STMF—the CMS is able to provide threat assessment that is based on information that goes far beyond packet sniffing and/or other network analysis techniques that are available to an STMF. Strictly as an example, since the CMS has a wealth of content object information available to it (including the actual contents of the content objects), it can identify ransomware threats 138 at (potentially) the moment of origination. As another example, since the CMS implements the concept of collaboration system user accounts, the CMS can identify compromised account threats 141 and share with the STMF. Still further, since the CMS is able to capture and analyze a wealth of user events over content objects, it can provide 'hints' (i.e., risk assessments) to a STMF. This is shown in FIG. 1A as activity-based risk assessment 143 and user-specific risk assessment 147. As discussed further hereunder, an activity-based risk assessment might and/or a user-specific risk assessment might correspond to a determination that a particular CMS user is behaving anomalously.

The environment comprehended in the foregoing presents merely one way of sharing information by and between a content management system and a security threat management facility. There are many ways to share such information, as well as there are many ways to combine the information. One approach for combining information from a security threat management facility with information from a content management system is shown and described as pertains to FIG. 1B.

Figure 1B:
FIG. 1B exemplifies a security perimeter formulation technique as used in systems that define a security perimeter based on content management system observations of user behavior, according to an embodiment.

FIG. 1B exemplifies a security perimeter formulation technique as used in systems that define a security perimeter based on content management system observations of user behavior. As an option, one or more variations of security perimeter formulation technique 1B00 or any aspect thereof may be implemented in the context of the architecture and functionality of the embodiments described herein and/or in any environment.

The figure is being presented to illustrate one technique of how to form security perimeter. More particularly, the figure is being presented to illustrate one technique of how to form a normalized security perimeter.

As used herein, a threat vector is a collection of threat assessment values where each one of the threat assessment values correspond to a risk value derived from a set of content-based threat values (CBTVs), and/or derived from a set of non-content-based threat values (NCBTVs). In some embodiments, at least some of the CBTVs and at least some of the NCBTVs are normalized (e.g., for purposes of comparison).

The figure includes a pair of example perimeters (first perimeter 108 and second perimeter 114). For purposes of illustration, the two perimeters are superimposed onto respective graphs (e.g., non-content-based vulnerabilities graph 110 and content-based vulnerabilities graph 112). In ongoing operations, the information used to form the non-content-based vulnerabilities graph is combined with the information used to form the content-based vulnerabilities graph, and this combination results in a combined security graph.

More specifically, and in accordance with this illustrative example, the information that is used to form the first perimeter 108 and second perimeter 114 is provided to a projector/combiner module 115. This projector/combiner module considers the provided information and produces a combined perimeter (e.g., the shown normalized security perimeter 118). The projector/combiner module operates to assess overall vulnerability considering both non-content-based vulnerabilities values as well as content-based vulnerabilities values.

As can be understood by those of ordinary skill in the art, the set of non-content-based vulnerabilities values and the set of content-based vulnerabilities values may be disjoint, or the set of non-content-based vulnerabilities values and the set of content-based vulnerabilities values may overlap. To explain, consider that an STMF reports a "high" vulnerability value for a particular IP address, and consider that a CMS reports a "medium" vulnerability value for the same IP address. Once normalized (e.g., within the projector/combiner module) such that the "high" vulnerability value of the STMF can be compared to the "medium" vulnerability value of the CMS, a risk value corresponding to exposing some operation to the higher vulnerability is assessed. This risk calculation can be done for any/all vulnerabilities as reported by the STMF and by the CMS, and the projector/combiner module can output a normalized security perimeter 118. This security perimeter can then be used to determine whether or not, or in some cases, how to perform an operation within the CMS.

In various embodiments, the STMF and the CMS operate substantially independently with respect to determining risks and/or vulnerabilities. Moreover, the STMF and the CMS operate over substantially different corpora of information and use substantially different techniques in calculating risk or vulnerability values. Strictly as a non-limiting example, using a first technique, an STMF establishes its set of security parameters based on calculations over information derived from packet inspection, whereas the CMS, using a second technique, establishes its set of security parameters based on calculations performed over information derived from analysis of user activities performed in the CMS or on content objects of the CMS. One of the advantages here is the ability to combine findings from both techniques in order to consider a more complete picture of risks and vulnerabilities. Moreover, one of the advantages here is the ability to combine findings (e.g., normalized values) from both techniques in order to define a normalized security perimeter.

In some cases, such a normalized security perimeter is formed by repeatedly selecting the higher of two risk values as reported by the STMF and by the CMS, and then plotting the selected higher of the two risk values as vertices of a shape (e.g., a polygonal shape). In such a case the area of the shape can be considered the total risk. If the total risk (e.g., total risk of performing a subject CMS operation) is greater than some risk threshold (e.g., as established by the CMS), then the subject operation at the CMS might be denied.

In some cases, such a normalized security perimeter is formed by repeatedly selecting the higher of two vulnerability values as reported by the STMF and by the CMS, and then plotting the selected higher of the two vulnerability values as vertices of a shape (e.g., a polygonal shape). In such a case the area of the shape can be considered the total vulnerability. If the total vulnerability (e.g., total vulnerability of performing a subject CMS operation) is greater than some vulnerability threshold (e.g., as established by the CMS), then the subject operation at the CMS might be denied.

In some embodiments, the calculated total risk and/or the calculated total vulnerability is compared against security policies. A security policy might codify semantics of, "Do not allow operations that correspond to a risk value greater than X." Or, a security policy might codify semantics of, "Do not allow operations that correspond to a vulnerability value greater than Y." Or, a security policy might codify semantics of, "Allow the operation to take place only after remediation." Accordingly, upon completion of comparing the normalized security perimeter to one or more security policies (step 120), an evaluation of choices is undertaken (decision 121).

The result of evaluation of choices is a determination of an option. This is shown by the three branches of decision 121, specifically "Allow" (i.e., allow the subject operation to proceed), "Deny" (i.e., deny further processing of the subject operation), or "Remediate." In this latter case of "Remediate," the CMS can take actions to lower the risks or vulnerabilities. Strictly as one example, a document containing personally identifiable information (PII) can be redacted to remove such PII.

Further details regarding techniques for identifying personally identifiable information can be found in U.S. patent application Ser. No. 17/334,420 titled "MAPPING OF PERSONALLY-IDENTIFIABLE INFORMATION TO A PERSON BASED ON NATURAL LANGUAGE COREFERENCE RESOLUTION" filed on May 28, 2021, which is hereby incorporated by reference in its entirety.

The foregoing written description pertains merely to one possible embodiment and/or way to form a security perimeter, and many variations are possible. For example, the security perimeter as comprehended in the foregoing can be enforced using an enforcement engine, an example of which is shown and described as pertains to FIG. 1C.

Figure 1C:
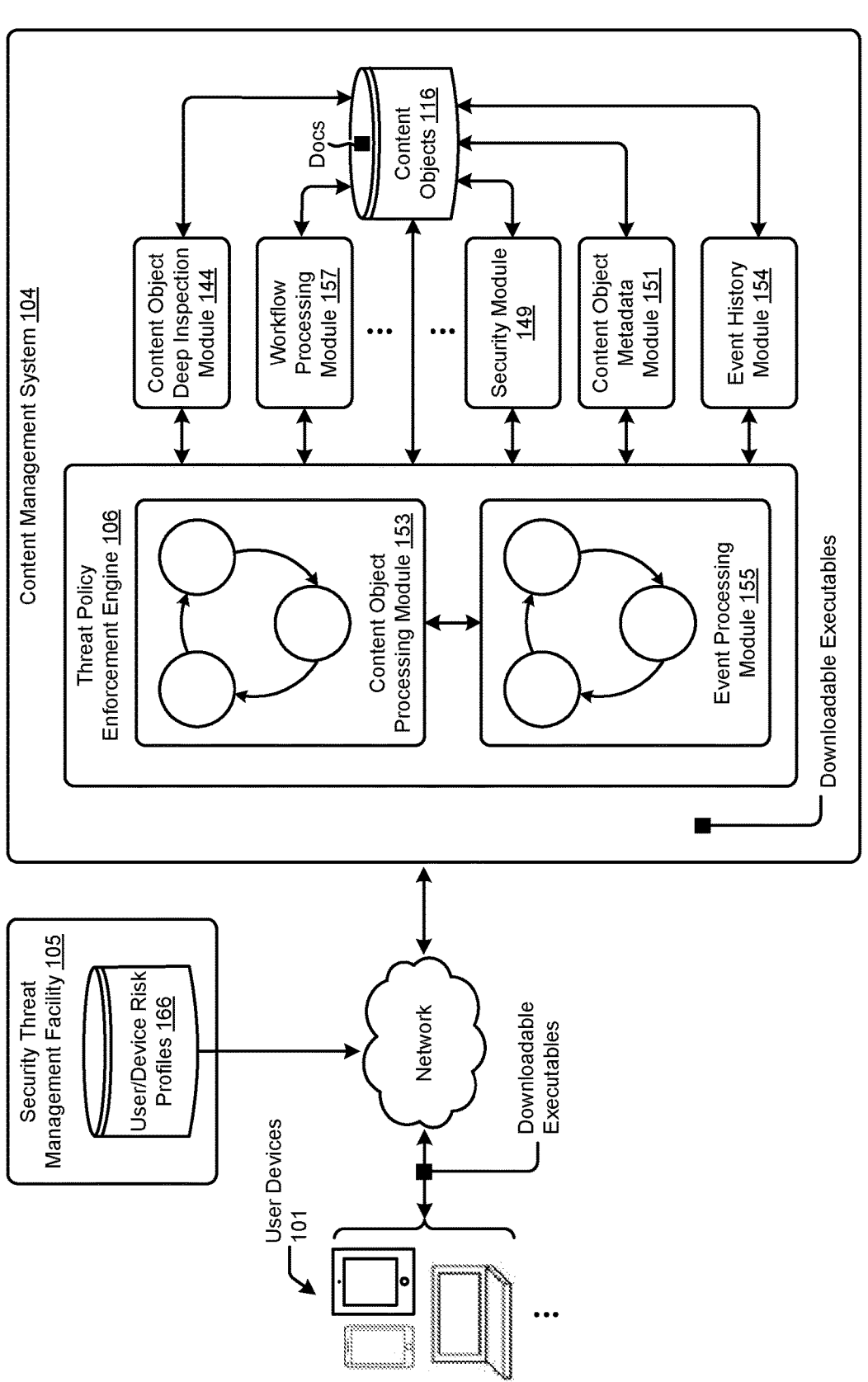
FIG. 1C exemplifies a content management system configuration that includes threat management facilities, according to an embodiment.

FIG. 1C exemplifies a content management system configuration that includes threat management facilities. As an option, one or more variations of content management system configuration or any aspect thereof may be implemented in the context of the architecture and functionality of the embodiments described herein and/or in any environment.

In this configuration, the shown threat policy enforcement engine 106 is situated within content management system 104. As such, a threat policy enforcement engine (e.g., comprising a content object processing module 153 and/or an event processing module 155) can interface directly with any of the special purpose modules (e.g., content object deep inspection module 144, workflow processing module 157, security module 149, content object metadata module 151, event history module 154) of the content management system. In some cases, threat policy enforcement engine can have direct access to documents drawn from the content objects 116.

User devices 101 interact with the CMS over/through the shown network. In some embodiments, the CMS hosts downloadable executables that can be retrieved from any of a variety of user device types (e.g., the shown smart phones, tablets, laptops). The user devices execute portions of the downloadable executables so as to interact with the content management system in accordance with some predefined protocol.

In this configuration, the CMS is able to receive information from the security threat management facility 105 over the network. More specifically, CMS is able to access user/device risk profiles 166 of the security threat management facility by issuing commands (e.g., application programming interface (API) commands) over the network. In some situations, the CMS is able to retrieve information about events that are captured by the STMF. As such, modules of the CMS, specifically event processing module 155, can advantageously combine information about events that are captured by the STMF with information about events that are captured into or by the event history module. In some cases, the combination of events, in particular aspects of temporally concurrent events, might serve to identify or predict malicious acts. As one example, consider that the STMF has identified a particular URL as being associated with a ransomware attack. Then further consider that the CMS has identified events corresponding to one or more suspicious file activities that are being carried out in a manner involving that particular URL. This combination serves to increase the confidence of a prediction that malfeasance is being perpetrated.

Although the foregoing narration is presented as a sequence of events, in actual practice, any combination of interactions between the user devices and the content management system, and/or between the user devices and the network, and/or any interactions between any of the constituent modules of the CMS may be carried out in any order and at any time. Moreover, when assessing total risk or vulnerability, any combination of interactions between modules of the CMS and the STMF may be carried out repeatedly so as to capture ongoing event streams. Moreover, dynamic risk assessments may avail of a knowledge-based learning model. One possible implementation of a knowledge-based learning model is shown and described as pertains to FIG. 1D.

FIG. 1D exemplifies a dynamic risk assessment technique including incorporation of threat assessments provided by a third-party security threat management facility. As an option, one or more variations of dynamic risk assessment technique 1D00 or any aspect thereof may be implemented in the context of the architecture and functionality of the embodiments described herein and/or in any environment.

The figure is being presented to illustrate how a knowledge-based risk assessment module 190 can be configured to incorporate information from both an STMF and a CMS. Further, the figure is being presented to illustrate how a knowledge-based risk assessment module 190 can be configured to emit allowance signals 197 and/or denial signals 195 and/or remediation signals 196.

The shown knowledge-based risk assessment module receives events in an event stream 168. Some incoming events are associated with an operation within the CMS and, as such, occurrence of this type of incoming event may cause the knowledge-based risk assessment module to evaluate the risk associated with permitting the associated operation to progress. In some cases the knowledge-based risk assessment module responds to an incoming event by gathering a first corpus of then-current information from the CMS and gathering a second corpus of then-current information from the STMF. The combination of gathered information is then used to calculate a total risk value 126. Such a total risk value can be used by itself to make decisions and/or such a total risk value can be used in conjunction with denial or remediation or allowance signals. To illustrate, a particular total risk value can be used to modulate the type of remediation. Strictly as one example, a relatively high total risk value as calculated with respect to a particular content object might imply that portions of the particular content object should be redacted, whereas a relatively low total risk value as calculated with respect to the same particular content object might imply that portions of the particular content object should be watermarked so as to facilitate forensic analysis.

As shown, the combination of gathered information includes information gathered from the CMS (e.g., a content sensitivity level 170, any amount of subject content object metadata 193, and any amount of device characteristics 191 that pertain to the device or devices associated with the incoming event or events). Additionally, and as shown, the combination of gathered information includes information gathered from the STMF (e.g., network characteristics 192, malware risks 194, endpoint risks 189, user-specific risks 186 and/or device-specific risks 199).

Some implementations of knowledge-based risk assessment module 190 include emission of new policies 198. Such new policies might involve codification into logical expressions or rules or algorithms that correspond to the semantics of "Only allow operation X when condition Y is true." In some cases, a new policy might refer to specific activity prevention technique and/or activity enjoinment 137 (e.g., copy/paste operations). Additionally or alternatively, new policies might involve codification into logical expressions or rules or algorithms that correspond to the semantics of exceptions 135 such as, "Do not allow operation X except if the subject user has metadata pair 'Role=Administrator'." Additionally or alternatively, new policies might involve or be accompanied by executable code (e.g., observation agent code 127, a particular risk assessment algorithm 113, and/or adaptive remediation agent code 139).

To further explain, an observation agent might be deployed when a risk value is close to a threshold, or when a statistical confidence interval is deemed as "too low." To explain even further, a particular configuration of adaptive remediation agent code might be deployed in response to a particular set of inputs being present at a particular time. For example, one or more forms of adaptive remediation agent code might be deployed when one or more emitted remediation signals 196 indicate that a user-specific forensic watermark is needed. As another example, an adaptive remediation agent might be activated when a particular threat vector (e.g., involving a set of risks or vulnerabilities, and/or involving a set of weights that are applied to individual elements of a threat vector) has a magnitude that is greater than some particular threshold. In the event of exceeding a particular threshold, certain CMS activities might be curtailed during a particular timeframe or for a particular user or group of users. An adaptive remediation agent can process restrictions and/or permissions, and/or exceptions. Any number of configurations of the foregoing adaptive remediation agent can be deployed to run concurrently or in series. In fact, any number of configurations of the foregoing adaptive remediation agent can be deployed to run conditionally based on aspects of gathered then-current events.

The foregoing written description pertains to merely one possible embodiment and/or way to implement a dynamic risk assessment technique, and many variations are possible. For example, the dynamic risk assessment technique as comprehended in the foregoing can be implemented in conjunction with CMS user-to-user and CMS user-to-file quantification techniques, one example of which is shown and described as pertains to FIG. 1E.

Figure 1E:
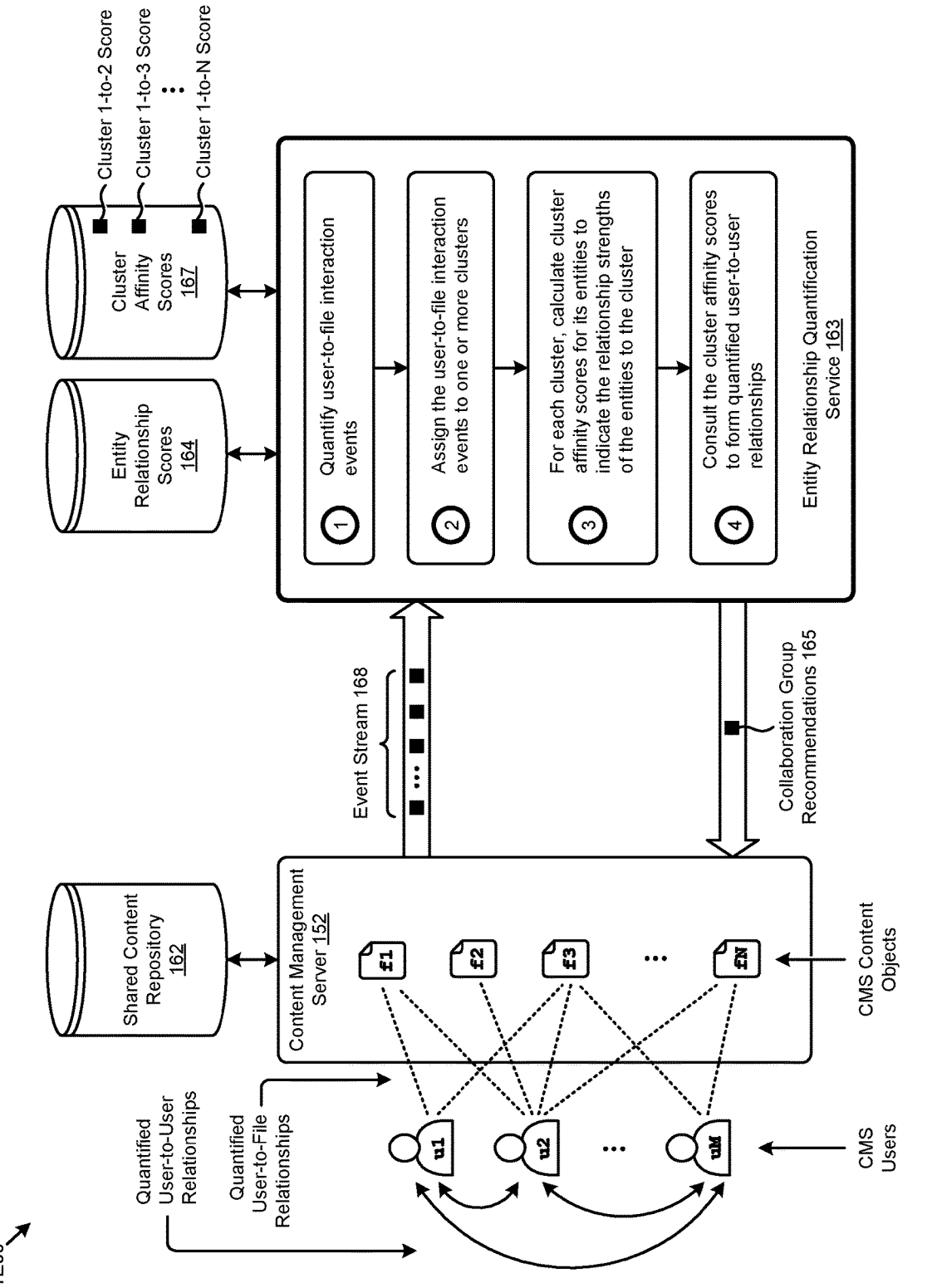
FIG. 1E exemplifies a system for quantifying CMS user-to-user relationships and CMS user-to-file relationships, according to an embodiment.

FIG. 1E exemplifies a system for quantifying CMS user-to-user relationships and CMS user-to-file relationships. As an option, one or more variations of system for quantifying CMS user-to-user and CMS user-to-file relationships 1E00 or any aspect thereof may be implemented in the context of the architecture and functionality of the embodiments described herein and/or in any environment.

As previously mentioned, we live in a world full of malefactors, and bringing new members into a CMS introduces an assumed risk that persists at least until the trustworthiness of the new member can be assessed. One way of quantifying the assumed risk is to correlate activities of the new member to other "known trustworthy" CMS users, and one way to do that is to observe the behavior of a CMS user over time and correlate the observed behavior to 'known good' behaviors.

Now, at least inasmuch as a CMS is able to capture events from any CMS user to any CMS file, it follows that user-to-user relationships can be quantified based on the occurrence of activities on, for example, the same file by two different CMS users, or more specifically, occurrence of file access activities initiated by two or more user devices. In the foregoing example, the relationship between a first one of the two different CMS users and a second one of the two different CMS users is merely due to applying a technique that observes the two CMS users' activities over the same file. However, user-to-user relationships can be quantified based on other criteria as well. User-to-user relationships are useful in the context of calculating augmented threat assessment values at least in that the various characteristics and behaviors of two or more users who are involved in strong user-to-user relationships may be operating in cahoots—and thus would/should be subject to increased observation of and scrutiny over their activities.

In modern CMS deployments, there may be many thousands (or millions) of users and there may be millions (or even billions) of events per hour. Accordingly, statistical measures are used to characterize user behaviors. A clustering technique that facilitates the calculation of such statistical measures is discussed hereunder.

In this embodiment, a stream of user activities (e.g., interaction events) are continually captured so as to facilitate production of continually updated clusters of entities (e.g., pertaining to users, files, etc.) which in turn are used to calculate statistical measures, which in some cases are used in turn to form collaboration groups. As shown, a set of entity relationship scores 164 (e.g., quantified user-to-file relationships, quantified user-to-object relationships, quantified user-to-user relationships, quantified object-to-object relationships) are formed based on the stream of user activities (e.g., a content object preview, an edit event, a delete event, etc.). The entities associated with the activities are assigned to one or more clusters.

A cluster affinity score for each entity in each of the clusters is then calculated to indicate a relationship strength between the entity and the respective cluster. The cluster affinity scores 167 are consulted to identify the clusters to which a particular entity is most strongly related. In certain embodiments, the identified clusters are associated with cluster-to-cluster scores (e.g., cluster 1-to-2 score, cluster 1-to-3 score, . . . , cluster 1-to-N score) are presented in a user interface (UI). As an example, the identified clusters and their inter-cluster scores can be presented to a particular user in the form of a graph, or in the form of one or more collaboration group recommendations 165. Affinity between clusters suggests that the users associated with the clusters are collaborating. An alternate interpretation of a calculated affinity between clusters can suggest that the users associated with the clusters are in cahoots with respect to some malfeasance. In either case, a system that assesses threats needs to know how a given set of users are interrelated.

The diagram shown in FIG. 1E is merely one example representation of the herein disclosed techniques that facilitate event-based clustering of collaborating entities in highly dynamic shared content environments. As shown, a set of CMS users (e.g., user "u1", user "u2", . . . , user "uM") interact with a set of CMS content objects (e.g., file "f1", file "f2", file "f3", . . . , file "fN"). CMS content objects can be any content object (e.g., file, folder, document, image, video, etc.) from a shared content repository 162. In certain embodiments, access to and/or interaction with CMS content objects can be facilitated by a content management server 152.

As earlier mentioned, in modern distributed computing and storage platforms (e.g., cloud-based content management platforms), the makeup of CMS users is often very dynamic (e.g., employees come and go, change roles, etc.) as is the makeup of content objects in a shared content repository 162 (e.g., content objects are frequently added, deleted, edited, reorganized, etc.). Further, the number of CMS users, the number and range of CMS content objects, and so on can expand over time to ever larger and larger numbers. As such, identification of user-to-user relationships presents many computing challenges. As an example, user "u1" in San Francisco who is interacting with files "f1" and "f3" might not know of the possible synergetic benefits that can be achieved by joining a collaboration group comprising user "u2" in Seoul, who is also interacting with files "f1" and "f3", as well as user "uM" in London, who is interacting with file "f3".

The herein disclosed techniques address identification of user-to-user relationships by responding to a stream of entity interaction events so as to produce continually updated clusters of entities (e.g., users, files, etc.) to facilitate real-time formation of collaboration groups. In certain embodiments, and as illustrated, occurrences of entity interaction events invoke a stream (e.g., event stream 168) that are processed by an entity relationship quantification service 163. As shown, an entity as discussed in FIG. 1E can describe a user or a content object. An entity might also represent a computing process or computing device that interacts with content objects and/or other entities. An entity might further represent a collection of entities, such as an enterprise that comprises a set of users, or a folder that comprises a set of files.

Various entity relationships associated with the entities involved with entity interaction events are quantified. As shown, the first step is to quantify user-to-file interaction events (operation 1). Strictly as one example of quantifying a user-to-file interaction event, an entity interaction event that pertains to user "u1" editing file "f3" might correspond to an entity relationship score of "10" for the "u1-f3" entity pair. The entities associated with the entity interaction event are assigned to one or more clusters (operation 2). In some cases, an entity might have been previously assigned to a particular cluster. A cluster affinity score for each entity in each of the clusters is then calculated to indicate a relationship (e.g., affinity) strength between the entity and the respective cluster (operation 3). The cluster affinity scores are consulted to identify the clusters to which a particular entity is most strongly related (e.g., the clusters with the highest cluster affinity scores) to facilitate real-time quantification of user-to-user relationships (operation 4). Such quantified user-to-user relationships can be used for many purposes.

For example, the three clusters that have the highest three-cluster affinity scores for user "u1" can be delivered to content management server 152 as collaboration group recommendations 165 for display in a user interface. As another example, such quantified user-to-user relationships can be used to inform an STMF. The STMF can in turn use knowledge of the quantified user-to-user relationship in its own STMF threat assessments. To further elucidate, and referring again to the notion that two or more members of a CMS might actually be in cahoots—possibly with nefarious plans to exfiltrate sensitive information-—the STMF can make its own threat assessment, and possibly thwart malfeasance by advising subscribers of the STMF of the potential malfeasance.

Further details regarding techniques for quantifying user-to-user relationships can be found in U.S. Pat. No. 10,747, 786 titled "SPONTANEOUS NETWORKING" issued on Aug. 18, 2020, which is hereby incorporated by reference in its entirety.

Figure 2:
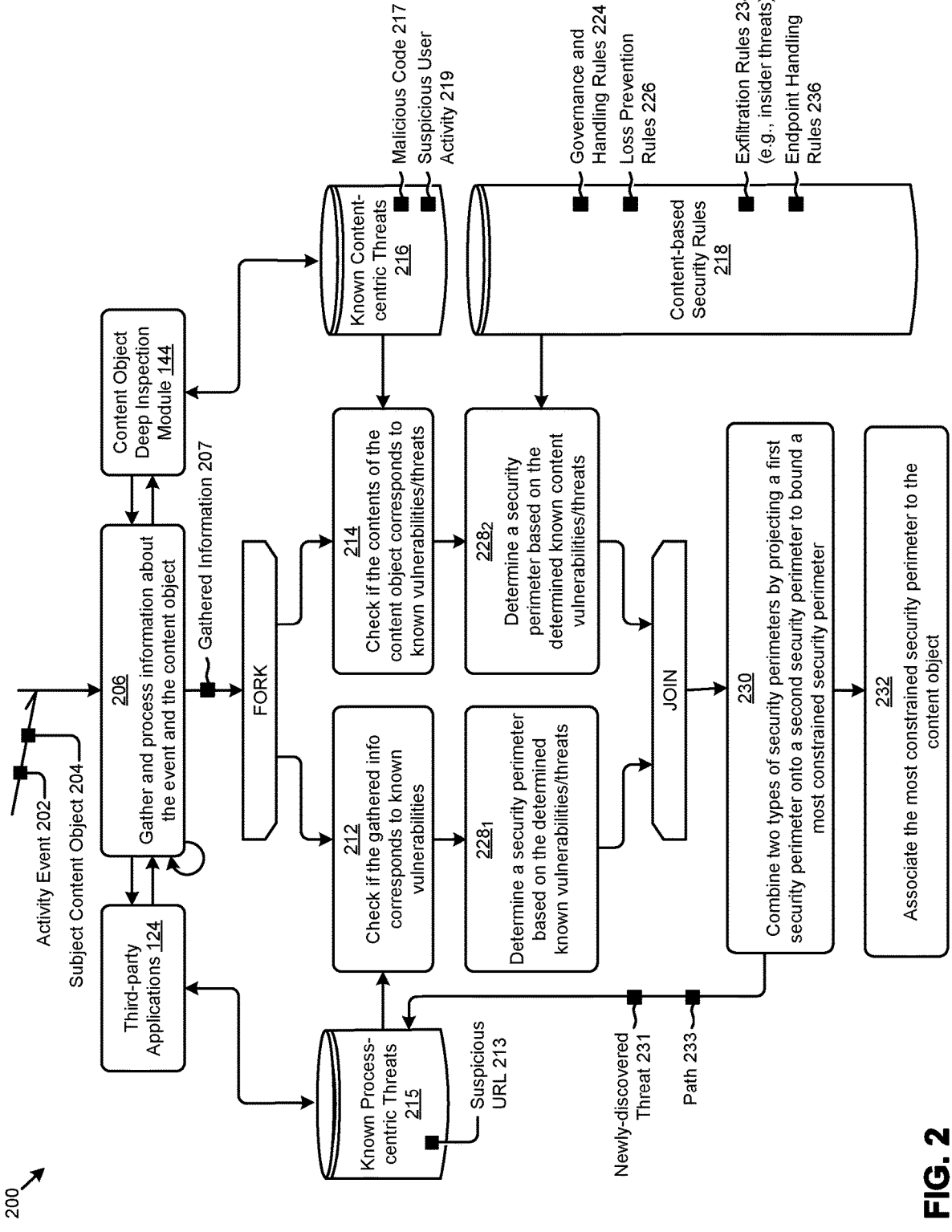
FIG. 2 depicts an example dynamic risk assessment system that combines content management system observations with threat assessments derived from a third-party security threat management facility, according to an embodiment.

FIG. 2 depicts an example dynamic risk assessment system that combines content management system observations with threat assessments derived from a third-party security threat management facility. As an option, one or more variations of dynamic risk assessment system 200 or any aspect thereof may be implemented in the context of the architecture and functionality of the embodiments described herein and/or in any environment.

The figure is being presented to illustrate a technique for combining two types of security perimeters where the combined (more constrained security perimeter) is formed by projecting a first security perimeter onto a second security perimeter. There are many steps involved in order to resolve to a more constrained security perimeter that is, in turn, used to enforce a dynamically-determined security policy over a content object.

The flow of FIG. 2 commences upon receipt (at step 206) of an activity event 202 over a corresponding subject content object 204. Step 206 serves to gather and process information about the event and the content object. As shown, the processing of step 206 includes gathering information from two different corpora, specifically, from third-party applications 124 of an STMF and from a content object deep inspection module 144 of a CMS. The gathered information 207 is then used in a FORK/JOIN block.

The left arm of the FORK/JOIN block primarily deals with defining a security perimeter that derives from processing by or under control of the STMF (e.g., known process-centric threats 215), whereas the right arm of the FORK/JOIN block primarily deals with defining a security perimeter that derives from the processing of the CMS (e.g., known content-centric threats 216).

At step 212, information that derives from the foregoing activity event 202 and/or from any data within the content objects and/or data pertaining to content objects 148 (e.g., subject content object 204 and/or corresponding subject content object metadata 193) might be used to cross-correlate to known process-centric threats (e.g., suspicious URL 213). Similarly, information that derives from the foregoing activity event 202 and/or from the subject content object associations 328 might be used to cross-correlate to known content-centric threats (e.g., malicious code 217 and/or suspicious user activity 219).

At step 214, a check is undertaken to determine of the content of the subject content object corresponds to known vulnerabilities. In doing so, any amount of gathered information and any number of cross-correlations (e.g., cross-correlations between known process-centric threats and known content-centric threats) may be identified.

Based on the gathered information and any determined cross-correlations, two different security perimeters are formed. A first security perimeter is formed at step 228₁ and a second security perimeter is formed at step 228₂. Step 228₂ might be informed by a plurality of content-based security rules 218, which content-based security rules might include any number of rules or characteristics that apply to, or are at least partially derived from, the subject content object and/or rules that at least partially correspond to the actual contents of the subject content object.

The content-based security rules 218 of FIG. 2 shows merely some example rules that are that are at least partially derived from or corresponding to the actual contents and/or determined characteristics of the subject content object. Strictly as a selection of example rules, consider the rules in Table 1.

TABLE 1

| Content-based security rules | |
| --- | --- |
| Rule Handle | Semantics |
| Governance and handling rules 224 | Determination of governance (e.g., retention period) and/or other handling (e.g., legal holds) of content objects are based on the combination of the governance predicates or handling predicates as applied to the contents of a subject content object. |
| Loss prevention rules 226 | Content objects that are deemed to be of a higher sensitivity are subjected to a higher degree of network security and sharing restrictions. |
| Exfiltration rules 234 | Activities over content objects that are made accessible via shared links are subjected to heightened scrutiny. A user corresponding to such activities is subjected to increased observance. Access behaviors over these content object are screened for suspicious downloading events. These content objects might be subjected to forensic watermarking, including video watermarking. |
| Endpoint handling rules 236 | Transmission of a sensitive subject content object to or through foreign jurisdictions are subjected to heightened security, possibly involving invocation of advanced authentication (e.g., multi-factor authentication). |

As can be understood, any/all of the foregoing rules are codified in terms of one of more security parameters. For example, consider a subject content object that is referenced in a shared link. Now further consider that once the shared link is released, anyone who has the link is at least potentially able to access the subject content object. Using only the security perimeter of the CMS, the CMS might honor an access request to the content object via the shared link, irrespective of the identity of the requestor. On the contrary, if a security perimeter of the STMF indicates that the requestor (e.g., via the requestor's provided identity and/or the requestor's IP address) presents a known threat, then a combination of the security perimeter of the CMS and the security perimeter of the STMF define a safe security perimeter. Note that in this example, (1) the CMS did not initially know that the requestor presented a threat, and (2) the STMF did not initially know that the subject content object was referenced in a shared link, thus presenting a vulnerability. As such, what is needed is a way to combine the two security perimeters.

Step 230 serves to combine two types of security perimeters by projecting a first security perimeter onto a second security perimeter. The result is a security perimeter that is bounded by the most constrained (e.g., least risky or least vulnerable) security perimeter. Of course the foregoing shared link example is merely one example. Other examples abound and, in some cases, the combination of the two security perimeters results in a newly-discovered threat. Any newly-discovered threat 231 (e.g., referring to or deriving from user/account compromise detection) that is determined by the CMS (e.g., at step 230) can be passed to the STMF. Following the foregoing example, it appears that the requesting user who had been previously associated with a threat is now, by virtue of having access to a vulnerable path (e.g., the shared link) is properly deemed to be suspicious. This determination by the CMS should be shared with other participants in the secure ecosystem. In this case, the determination that the requesting user is properly deemed to be suspicious should be provided to the STMF (e.g., via path 233) as a newly-discovered threat.

Upon finding that a particular set of security parameters pose a security risk or vulnerability, that finding should be associated with the subject content object. Step 232 serves to associate the most constrained security perimeter to a subject content object. Henceforth, that most constrained security perimeter should be observed when processing then and future actions over a particular corresponding subject content object, at least so long as the security threat is present.

In some cases a CMS, finding that a particular set of security parameters pose a security risk or vulnerability, that CMS finding can be codified into a CMS threat mitigation policy. Moreover such a CMS threat mitigation policy can be shared with any one or more STMFs. In the obverse, a STMF finding that a particular set of security parameters pose a security risk or vulnerability, that STMF finding can be codified as a STMF threat mitigation policy, and such an STMF threat mitigation policy can be shared with a CMS. A bidirectional synchronization technique is shown and described as pertains to FIG. 3.

Figure 3:
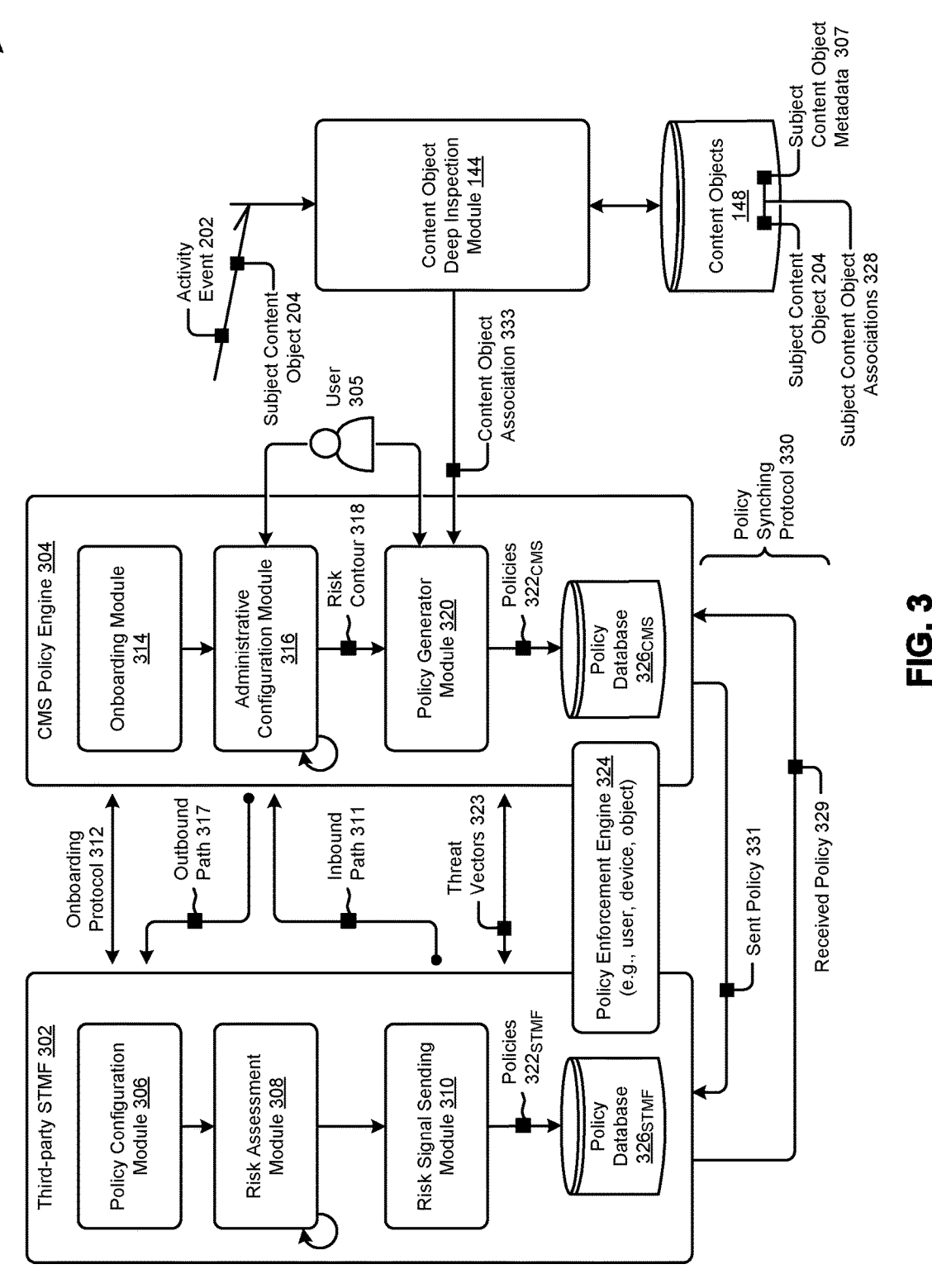
FIG. 3 depicts an example policy synchronization technique that coordinates content management system threat mitigation policies with threat mitigation policies of a third-party security threat management facility, according to an embodiment.

FIG. 3 depicts an example policy synchronization technique that coordinates content management system threat mitigation policies with threat mitigation policies of a third-party security threat management facility. As an option, one or more variations of policy synchronization technique 300 or any aspect thereof may be implemented in the context of the architecture and functionality of the embodiments described herein and/or in any environment.

This figure is being presented to illustrate how a CMS policy engine 304 can exchange policies with a third-party STMF 302. As shown, the CMS policy engine 304 maintains its own policy database $326_{CMS}$ while, at the same time, the third-party STMF 302 maintains its own policy database $326_{STMF}$. Each of the CMS policy engine and the third-party STMF can define and maintain their respective own intra-system policies. Additionally, in this embodiment, both the CMS policy engine 304 and the third-party STMF 302 are configured to define and maintain inter-system policies that are shared between the two systems. Some mechanism for sharing between the two systems is needed, at least in order to ensure that the two systems share the same syntax and representation of policy-related information.

For example, if an STMF represents a risk value as an integer in the range [1, 1000], and a CMS represents a risk value as a floating point number in the range [0, 1), then the two systems would either need to know about such a difference in representation, or the two systems would need to agree on some common representation. Negotiation of representations can take place during a phase of the shown policy synching protocol 330 or negotiation of representations can take place during a phase of the shown onboarding protocol 312. The onboarding protocol and/or the policy synching protocol can be configured to exchange policies at any moment in time, either in an initial onboarding phase (e.g., as carried out by onboarding module 314) or dynamically as new policies are configured (e.g., via sent policy 331 and/or via received policy 329).

Policies can be configured at any moment in time. In a first case at the CMS, user 305 might manipulate a user interface to define policies. Such a user interface can be configured into the shown administrative configuration module 316. One possible output of an administrative configuration module is a risk contour 318 that defines a maximum or other sort of threshold that characterizes the degree of risk the administrator specified. A risk contour can have any number of vertices and any number of dimensions.

In a second case at the CMS, a policy can be generated dynamically by policy generator module 320. In this latter case, policy generation can be informed by content object associations 333, which content object associations relate a particular subject content object 204 to its corresponding subject content object metadata 307. To explain by example, a particular subject content object 204 might be determined (e.g., via content object deep inspection module 144) to contain highly sensitive information, and thus receives a metadata marking of "HIGHLY SENSITIVE." This determination and marking can be codified via one or more subject content object associations 328, which associations can in turn be referred to in policies.

As previously mentioned, policies can be configured at any moment in time, including in response to an output from the administrative configuration module, and/or policies can be configured at any moment in time in response to an event of the CMS. Strictly as an example, content object deep inspection module 144 can be invoked upon receipt of an activity event 202 pertaining to subject content object 204. The content object deep inspection module may, in turn, generate and store content object metadata and any one or more corresponding subject content object associations 328 for the subject content object, and may in turn communicate the content object association to policy generator module 320.

The policy generator may be invoked in response to the occurrence of a new content object association. Moreover, the policy generator may formulate newly-generated policies (e.g., policies $322_{CMS}$) that refer to one or more subject content object associations. Such newly-generated policies are then stored in policy database $326_{CMS}$, and these newly-generated policies at least potentially become subject to policy synching with the third-party STMF. As shown in the figure, the third-party STMF has its own policy configuration module 306. Such an STMF policy configuration module can operate independently from the CMS policy engine.

Ongoing Risk Assessments

On an ongoing basis, the third-party STMF performs risk assessments (e.g., via risk assessment module 308). When a risk assessment rises to the level that information pertaining to the risk (e.g., risk signals) should be sent out, the third-party STMF can do so at will. Accordingly, the shown risk signal sending module 310 is configured to be able to send risk signals to STMF subscribers. In some cases, when a risk assessment rises to a particular level, the third-party STMF might newly-codify one or more policies $322_{STMF}$. For example, suppose that a particular IP address was deemed (e.g., by risk assessment module 308) to be suspicious, and further suppose that the degree of suspiciousness or risk was at least to the level that subscribers should be advised. In this situation, risk signal sending module 310 will handle initial dissemination of the advice.

One possible technique for communicating a newly-codified policy from the third-party STMF to the CMS policy engine involves the shown inbound path 311, which path terminates into the administrative configuration module of the CMS policy engine. Communication over this path can be synchronous or asynchronous with respect to generation of newly-codified policies. In some embodiments, the third-party STMF causes one or more communications to the CMS policy engine. In the same or other embodiments, the third-party STMF makes a newly-codified policy accessible to the CMS policy engine, possibly by merely advising the CMS policy engine of the availability of any newly-codified policies. Similarly, in the reverse direction, one possible technique for communicating a newly-codified policy from the CMS policy engine to the third-party STMF involves the shown outbound path 317, which path terminates into the policy configuration module of the third-party STMF.

Amalgamated Policies

By availing of the foregoing interfaces between third-party STMF 302 and CMS policy engine 304, it becomes possible for the CMS policy engine to generate policies that use, at least in part, information that originates at, or is derived by, the third-party STMF. In the other direction, it becomes possible for the third-party STMF to generate policies that use, at least in part, information that originates at, or is derived by, the CMS policy engine. This capability greatly strengthens the overall ecosystem against malicious activities. To explain: (1) a CMS policy engine can generate policies that use information that the CMS might not have within its own operational footprint (e.g., identification of suspicious URLs based on packet inspection), and (2) a third-party STMF policy engine can generate policies that use information that the third-party STMF might not have within its own operational footprint (e.g., identification of suspicious users based on tracking access behavior over content objects). Strictly as examples, Table 2 depicts amalgamated policies.

TABLE 2

| Amalgamated policies |
| --- |
| Amalgamated Policy Narration |
| Upon CMS identification of suspicious download by a particular user, check if the STMF has tagged that user as a known threat |
| Upon STMF identification of a suspicious device fingerprint, check if the CMS has identified the device in the context of suspicious activity |

Some embodiments exploit a tight integration between a third-party STMF and a CMS policy engine. One advantage of such a tight integration is the speed with which threat countermeasures can be implemented. Consider the situation where a malaprop launches a swarm of 5000 copies of a virus. It would be far better to deploy countermeasures immediately upon classification of the first copy rather than to do so later, at least inasmuch as implementation of policy enforcement introduces latency.

Accordingly, policy enforcement engine 324 is architected so as to invoke countermeasures immediately upon identification of malicious events. As shown, policy enforcement engine 324 is able to act on malicious events that arise from any one or more of, a user's action (e.g., pertaining to anomalous downloads), a device's action (e.g., pertaining to suspicious network transmissions), or an object's actions (e.g., where the object is an executable virus). This concept of ultra-fast identification of malicious activities and ultra-fast countermeasure deployment and/or containment can be applied to many types of malicious activities. Strictly as one further example, if inappropriate exfiltration of data were detected, a low latency policy enforcement engine can immediately invoke countermeasures (e.g., by terminating the user session, by erecting logical shields against a repeat, etc.).

One way to implement low latency policy enforcement is to implement shared workflows where either (or both) the CMS and/or the STMF can invoke such a shared workflow. Such a shared workflow might in turn invoke additional workflows, either a workflow under control of the STMF, or a workflow under control of the CMS, or both. In this latter case, where a shared workflow invokes both a first workflow under control of the STMF as well as a second workflow under control of the CMS, the first and second workflows can carry out a protocol (e.g., a low latency inter-system protocol).

Still further, amalgamated policies can be used to eliminate or reduce false positives, where a user is deemed to be behaving in a suspicious manner, but where in point of fact the user is actually behaving in a manner that is consistent with the role of the user. One way to eliminate or reduce false positives is to implement exceptions in policies. In this example, what is needed is a way to identify that the suspicious user is actually behaving in a manner that is consistent with the role of the user is to rely on collaboration group membership. That is, if the suspicious user is a member of the "Information Technology Team" collaboration group, then what might otherwise be flagged as an anomalous download can instead be deemed to be normal/ expected behavior. Such types of group-based or role-based policy exceptions can apply to a device as well as to a user.

Threats (e.g., threats that are detected in real time) can be codified into threat vectors 323, and such threat vectors (sometimes referred to as "attack vectors") can be exchanged by and between a CMS and an STMF at any moment in time. For example, a threat vector might be sent by a CMS when the CMS detects some anomalous behavior. Additionally or alternatively, a threat vector might be sent by an STMF when the STMF identifies a threat. Any known techniques (e.g., APIs, web service endpoints, network packets, etc.) and/or any combination of such techniques can be used to exchange threat vectors and/or to raise the attention of an intended recipient of a threat vector.

The foregoing written description pertains to merely one possible embodiment and/or way to implement policy synchronization. Many variations are possible. For example, the policy synchronization technique as comprehended in the foregoing can be implemented in conjunction with any one or more administrator-defined policies. Some example user interfaces that facilitate specification of administrator-defined policies are shown and described as pertains to FIG. 4A, FIG. 4B, and FIG. 4C.

FIG. 4A depicts an example threat policy configuration user interface as used in systems that define security perimeters based on content management system observations of user behavior. As an option, one or more variations of threat policy configuration user interface 4A00 or any aspect thereof may be implemented in the context of the architecture and functionality of the embodiments described herein and/or in any environment.

The shown threat policy configuration user interface exemplifies specification of two policies. A first policy ("Policy1") is defined to be invoked when a particular content object has a classification label (e.g., metadata associated with the particular content object) equal to "Confidential IP." A second policy ("Policy2") is defined to be invoked when a particular content object has a classification label equal to "Internal Only." As shown, the user interface includes a pop-up submenu that offers checkbox options that apply properties to the policy. In this example, the property options include (1) a content-specific policy, (2) an app-specific policy, (3) an exfiltration policy, and (4) a multi-party reconciliation policy. Clicking one or more checkboxes causes additional modals and or other screen devices to appear, any of which are configured to be able to accept further specification from the administrator. As such, a content object bearing a classification label equal to "Internal Only" might be subject to multiple policies.

The foregoing pertains to association of one or more policies to the occurrence of when a content object bears a particular classification label, and such one or more policies might involve dynamic/adaptive remediation and/or raising of alerts. However, there are other types of occurrences that do not necessarily involve a content object. One way to handle such a situation is to provide a mapping between an alert notification and a threat impact mitigation action. A user interface that is configured to handle such a mapping between an alert notification and a threat impact mitigation action is shown and described as pertains to FIG. 4B.

FIG. 4B depicts an example threat impact mitigation action mapping technique. As an option, one or more variations of threat impact mitigation action mapping technique 4B00 or any aspect thereof may be implemented in the context of the architecture and functionality of the embodiments described herein and/or in any environment.

This figure is being presented to illustrate how an alert can be mapped to a threat impact mitigation action. More specifically, is being presented to exemplify an embodiment where a particular type or class of alert can be mapped to respective threat impact mitigation actions.

Before accepting UI inputs, the user's identity is securely authenticated and applicable permissions or authorizations are securely verified. In this case, authentication and authorizations are verified using an API key. Once verified, the user interface will permit the administrator to map the shown alert risk levels (e.g., "Low," "Medium," and "High") to specific threat impact mitigation actions. In the example shown, there are three threat impact mitigation actions, however these are merely a subset of possible threat impact mitigation actions. The first shown threat impact mitigation action establishes a policy whereby uploads and downloads are restricted from/to the endpoint referenced in a corresponding "High" alert risk level. The second shown threat impact mitigation action establishes an action whereby the referenced user is automatically logged out and the user is targeted for enhanced enforcement. The third shown threat impact mitigation action flags the user and endpoint to be monitored only. This third shown threat impact mitigation action corresponds to those as referenced in a "High" alert risk level.

In addition to the foregoing types of threat impact mitigation actions, threat impact mitigation might be carried out by merely enforcing a policy. An example user interface corresponding to enforcing a policy is shown and described as pertains to FIG. 4C.

Figure 4C:
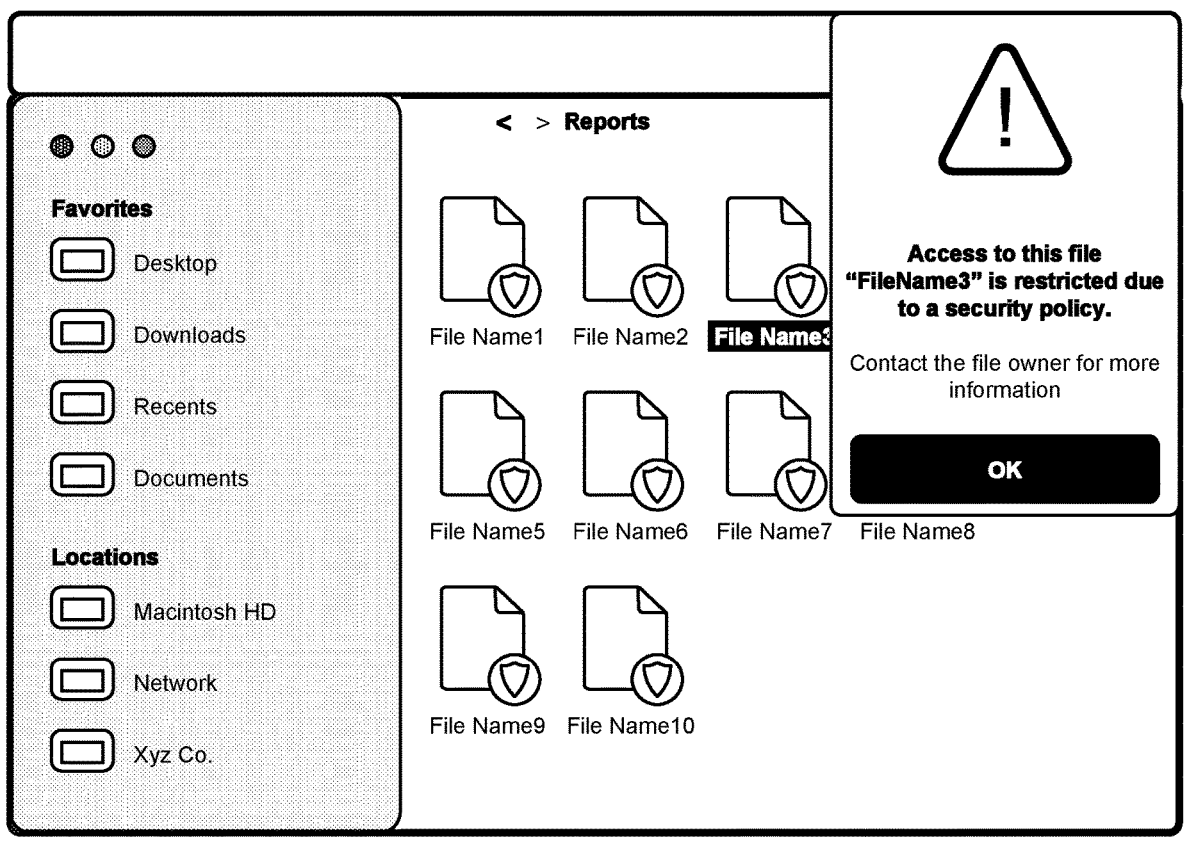
FIG. 4C depicts policy enforcement over a content management system content object, according to an embodiment.

FIG. 4C depicts policy enforcement over a content management system content object. As an option, one or more variations of policy enforcement over a content management system content object or any aspect thereof may be implemented in the context of the architecture and functionality of the embodiments described herein and/or in any environment.

The figure is being presented to illustrate how restrictive access policy enforcement might appear to a user. As shown, upon a user's attempt to access (e.g., open or preview) a selected file, any applicable security policies are applied. In this case, the user attempts to access "File Name3." The file "File Name3" does indeed have an applicable security policy and, in accordance with the configuration of the policy, rather than proceeding with granting the user access to file "File Name3," instead a modal pops up advising the user that "Access to this file 'File Name3' is restricted due to a security policy."

As can be understood by those of skill in the art, restricting access is not the only type of policy that mitigates threats. In fact, there are many use cases where, given a sufficiently high level of threat, more dire actions are carried out automatically. Some content management systems provide features that facilitate user access to files even in extenuating circumstances (e.g., by providing a user device-resident or offline copy of a content object). Some such features imply a high level of trust such that if the trust is breached, then extraordinary measures would need to be taken.

Figure 5:
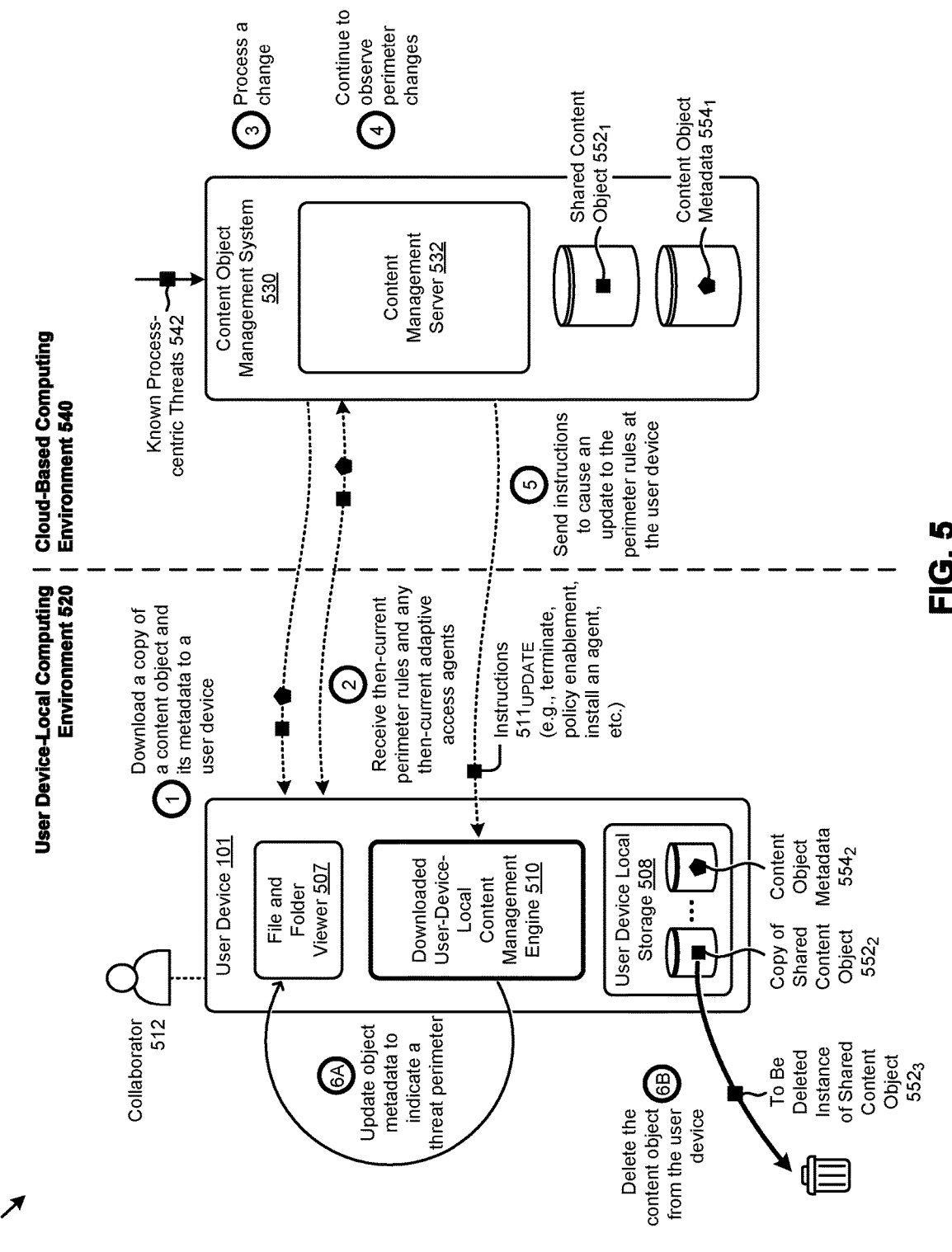
FIG. 5 depicts a policy enforcement use case as used in systems that support user device-resident copies of content objects, according to an embodiment.

FIG. 5 depicts a policy enforcement use case as used in systems that support user device-resident copies of content objects. As an option, one or more variations of a system that support user device-resident copies of content objects 500 or any aspect thereof may be implemented in the context of the architecture and functionality of the embodiments described herein and/or in any environment.

FIG. 5 illustrates one method for invoking a protocol to automatically enforce a security perimeter over a remotely-stored (e.g., user device-resident) instance of a content object. Specifically, the figure is being presented to explain a protocol that automatically expunges a content object copy from a user device. The high order interactions (e.g., operations, messages, etc.) exhibited by the computing components in part comprise one embodiment of the aforementioned protocol. As shown, the protocol is carried out as between operational entities withing a cloud-based computing environment 540 and a user device-local computing environment 520.

The content object replication scenario commences by deploying executable code that constitutes a local content management engine (CME). Responsive to a request for a download of a copy of the local CME from user device 101, an instance of the executable code of the local CME is configured for the particular type of user device and then delivered to the user device. For example, a collaborator 512 associated with user device 101 might access an instance of a file and folder viewer 507 to request a download of the local CME. Upon installation of the local content management engine (e.g., downloaded user-device-local content management engine 510 at user device 101, any listeners (e.g., local event listener, remote event listener, etc.) associated with instantiation of the local CME are instantiated.

When configuring an instance of a local CME for download to a particular type of user device (operation 1), various configuration steps may consider that one particular user device may have different characteristics from another particular user device. For example, one user device might be running the "iOS" operating system. Another user device might be running the "Android" operating system. Based on characteristics of the user device and/or user preferences, a set of capabilities and preferences can be determined. Such user device characteristics are observed when configuring the CME such that the local CME is configured so as to honor any particular device characteristics and/or user preferences pertaining to the user's device. In some cases, the aforementioned characteristics of the user device and/or user preferences are based, at least in part, on the capabilities of the user device, including any software installed on the user device. Once a user device has been configured, an agent/listener on the device requests any then-current security policies and/or perimeter rules (operation 2).

In any of the foregoing cases of download and installation, the user device will be configured to be able to respond to a click on a URL. As such, at some moment in time after installation of the CME, a content object URL is received at user device 101. The content object is stored in the user device local storage 508. Interactions between the user device and the content object management system 530 are carried out at the will of the user.

At some point in time, it can happen that a security policy is changed (operation 3). This can happen, for example, due to processing of incoming known process-centric threats 542. While that change is being processed, content management server 532 continues to observe policy changes and/or security perimeter changes (operation 4). At operation 5, and based on detection of such a change (e.g., caused by operation 3 or caused by operation 4), the content object management server sends updated instructions (e.g., instructions $511_{UPDATE}$) which are processed by the downloaded user-device-local content management engine 510).

In the event that the change requires merely a change to metadata (e.g., content object metadata $554_1$), the CME can take action to make such a change to the metadata at the user device (operation 6A). The need for a change to device-local metadata (e.g., content object metadata $554_2$) can arise, for example, if a corresponding content object (e.g., shared content object $552_1$) at the CME underwent a security classification change.

In the event that a policy or perimeter change would require that an affected content object be expunged from the user device, the CME can take applicable actions. In this embodiment, the CME will take steps to delete the affected content object (copy of shared content object $552_2$) from the user device (operation 6B). This is shown by the to be deleted instance of shared content object $552_3$ being on its way to the trash.

System Architecture Overview

Additional System Architecture Examples

Figure 6A:
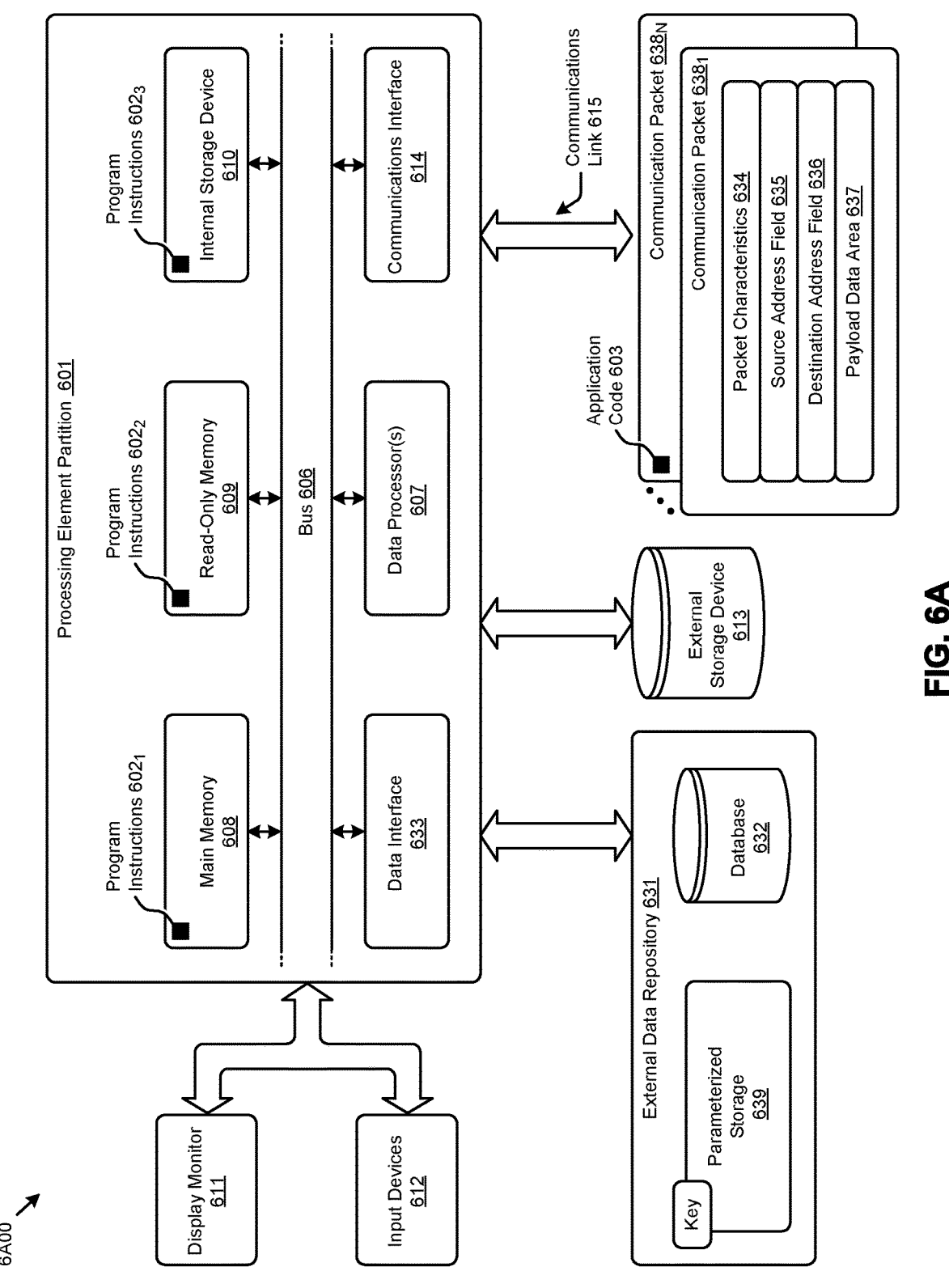
FIG. 6A, FIG. 6B, and FIG. 6C present block diagrams of computer system architectures having components suitable for implementing embodiments of the present disclosure and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. Computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program instructions contained in a memory. Such instructions (e.g., program instructions $602_1$, program instructions $602_2$, program instructions $602_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of communications interface 614 may comprise one or more networking ports that are configurable (e.g., pertaining to speed, protocol, physical layer characteristics, media access characteristics, etc.) and any particular instance of communications interface 614 or port thereto can be configured differently from any other particular instance. Portions of a communication protocol can be carried out in whole or in part by any instance of communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

Communications link 615 can be configured to transmit (e.g., send, receive, signal, etc.) any types of communications packets (e.g., communication packet $638_1$, communication packet $638_N$) comprising any organization of data items. The data items can comprise a payload data area 637, a destination address 636 (e.g., a destination IP address), a source address 635 (e.g., a source IP address), and can include various encodings or formatting of bit fields to populate packet characteristics 634. In some cases, the packet characteristics include a version identifier, a packet or payload length, a traffic class, a flow label, etc. In some cases, payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of a computer system 6A00. According to certain embodiments of the disclosure, two or more instances of computer system 6A00 coupled by a communications link 615 (e.g., LAN, public switched telephone network, or wireless network) may perform the sequence of instructions required to practice embodiments of the disclosure using two or more instances of components of computer system 6A00.

Computer system 6A00 may transmit and receive messages such as data and/or instructions organized into a data structure (e.g., communications packets). The data structure can include program instructions (e.g., application code 603), communicated through communications link 615 and communications interface 614. Received program instructions may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

Processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to defining a security perimeter based on content management system observations of user behavior. A module may include one or more state machines and/or combinational logic used to implement or facilitate the operational and/or performance characteristics pertaining to defining and/or sharing a security perimeter based on content management system observations of user behavior.

Various implementations of database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of defining and sharing a security perimeter based on content management system observations of user behavior). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to defining and sharing a security perimeter based on content management system observations of user behavior, and/or for improving the way data is manipulated when performing computerized operations pertaining to continuously updating content object-specific risk assessments.

Figure 6B:
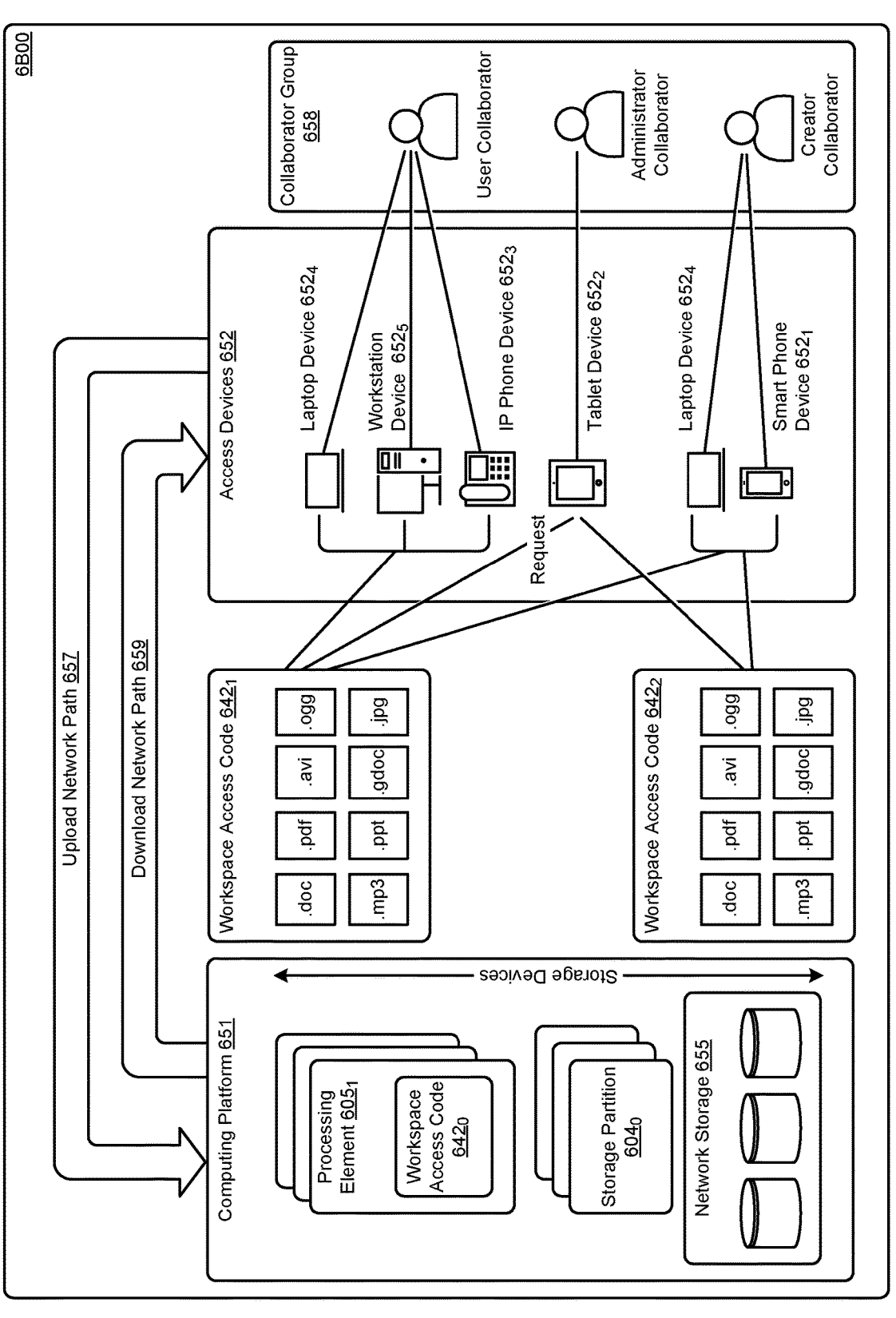

FIG. 6B depicts a block diagram of an instance of a cloud-based environment 6B00. Such a cloud-based environment supports access to workspaces through the execution of workspace access code (e.g., workspace access code $642_0$, workspace access code $642_1$, and workspace access code $642_2$). Workspace access code can be executed on any of access devices 652 (e.g., laptop device $652_4$, workstation device $652_5$, IP phone device $652_3$, tablet device $652_2$, smart phone device $652_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to or with any particular user or any particular group of users.

A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 651, including in a middleware setting. As shown, a portion of the workspace access code resides in and can be executed on one or more processing elements (e.g., processing element $605_1$). The workspace access code can interface with storage devices such as networked storage 655. Storage of workspaces and/or any constituent files or objects, and/or any other code or scripts or data can be stored in any one or more storage partitions (e.g., storage partition $604_0$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

Figure 6C:
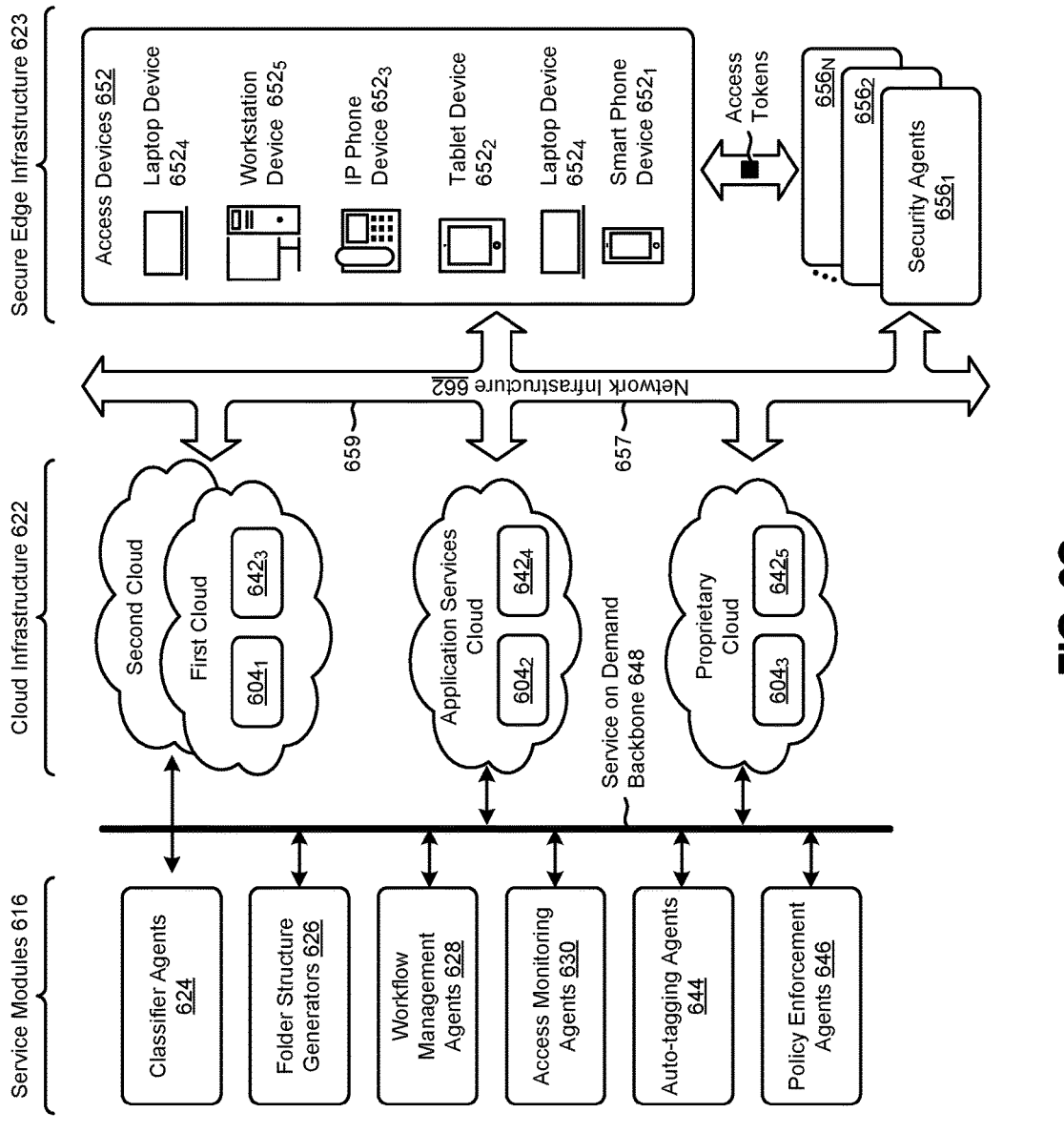

FIG. 6C depicts a block diagram of an instance of a cloud-based computing system 6C00 suitable for implementing embodiments of the present disclosure. More particularly, the cloud-based computing system is suitable for implementing a cloud content management system (CCM).

The figure shows multiple variations of cloud implementations that embody or support a CCM. Specifically, public clouds (e.g., a first cloud and a second cloud) are intermixed with non-public clouds (e.g., the shown application services cloud and a proprietary cloud). Any/all of the clouds can support cloud-based storage (e.g., storage partition $604_1$, storage partition $604_2$, storage partition $604_3$) as well as access device interface code (workspace code $642_3$, workspace code $642_4$, workspace code $642_5$).

The clouds are interfaced to network infrastructure 662, which provides connectivity between any of the clouds and any of the access devices 652. More particularly, any constituents of the cloud infrastructure 622 can interface with any constituents of the secure edge infrastructure 623 (e.g., by communicating over the network infrastructure). The aforementioned access devices can communicate over the network infrastructure to access any forms of identity and access management tools (IAMs) which in turn can implement or interface to one or more security agents (e.g., security agents $656_1$ security agents $656_2$, . . . security agents $656_N$). Such security agents are configured to produce access tokens, which in turn provide authentication of users and/or authentication of corresponding user devices, as well as to provide access controls (e.g., allow or deny) corresponding to various types of requests by devices of the secure edge infrastructure.

As shown, the cloud infrastructure is also interfaced for access to service modules 616. The various service modules can be accessed over the shown service on demand backbone 648 using any known technique and for any purpose (e.g., for downloading and/or for application programming interfacing, and/or for local or remote execution). The service modules can be partitioned in any manner. The partitioning shown (e.g., into modules labeled as classifier agents 624, folder structure generators 626, workflow management agents 628, access monitoring agents 630, autotagging agents 644, and policy enforcement agents 646) is presented merely for illustrative purposes and many other service modules can be made accessible to the cloud infrastructure. Some of the possible service modules are discussed hereunder.

The classifier agents serve to automatically classify (and find) files by defining and associating metadata fields with content objects, and then indexing the results of classification. In some cases a classifier agent processes one or more content objects for easy retrieval (e.g., via bookmarking). The folder structure generators relieve users from having to concoct names and hierarchies for folder structures. Rather, names and hierarchies of folder structures are automatically generated based on the actual information in the content objects and/or based on sharing parameters, and/or based on events that occur in the CCM.

Workflow management agents provide automation to deal with repeatable tasks and are configured to create workflow triggers that in turn invoke workflows at particularly-configured entry points. Triggers can be based on any content and/or based on any observable events. Strictly as examples, triggers can be based on events such as, content reviews, employee onboarding, contract approvals, and so on.

Access monitoring agents observe and keep track of use events such as file previews, user uploads and downloads, etc. In some embodiments, access monitoring agents are interfaced with presentation tools so as to present easy-to-understand visuals (e.g., computer-generated graphical depictions of observed user events).

Auto-tagging agents analyze combinations of content objects and events pertaining to those content objects such that the analyzed content objects can be automatically tagged with highly informative metadata and/or automatically stored in appropriate locations. In some embodiments, one or more auto-tagging agents operate in conjunction with folder structure generators so as to automatically analyze, tag and organize content (e.g., unstructured content). Generated metadata is loaded into a content object index to facilitate near instant retrieval of sought after content objects and/or their containing folders.

The policy enforcement agents run continuously (e.g., in the background) so as to aid in enforcing security and compliance policies. Certain policy enforcement agents are configured to deal with content object retention schedules, achievement of time-oriented governance requirements, establishment and maintenance of trust controls (e.g., smart access control exceptions). Further, certain policy enforcement agents apply machine learning techniques to deal with dynamic threat detection.

The CCM, either by operation of individual constituents and/or as a whole, facilitates collaboration with third parties (e.g., agencies, vendors, external collaborators, etc.) while maintaining sensitive materials in one secure place. The CCM implements cradle-to-grave controls that result in automatic generation and high availability of high-quality content through any number of collaboration cycles (e.g., from draft to final to disposal, etc.) while constantly enforcing access and governance controls.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for augmenting a database of threat assessment values, the method comprising:
   identifying a database of threat assessment values at a security threat management facility (STMF), wherein the threat assessment values include at least information pertaining to one or more users;
   operating a content management system (CMS) that tracks user-initiated content object interaction events;
   generating a further threat assessment value at the content management system, wherein the further threat assessment value is determined based at least in part on one of at least one of (A) one or more user-to-user relationships or (B) one or more user-to-file relationships as determined at the content management system; and establishing an augmented threat assessment using both the threat assessment values of the STMF with the further threat assessment value from the content management system, wherein the augmented threat assessment is increased if a suspect user has a scheduled termination date.

2. The method of claim 1, further comprising, providing the augmented threat assessment to the STMF.

3. The method of claim 1, wherein the user-to-user relationships are based on user-to-file interaction events by two or more user devices.

4. The method of claim 3, wherein at least one of the two or more user devices participates in an anomalous download.

5. The method of claim 3, wherein the STMF comprises a third-party application, or wherein the STMF comprises a module within the content management system.

6. The method of claim 1, wherein the STMF is separate from the content management system.

7. The method of claim 1, wherein the augmented threat assessment is increased if a suspect user is accessing the same files as a user from a different department.

8. A non-transitory computer readable medium having stored thereon a sequence of instructions which, when stored in memory and executed by one or more processors causes the one or more processors to perform a set of acts for augmenting a database of threat assessment values, the set of acts comprising:
   identifying a database of threat assessment values at a security threat management facility (STMF), wherein the threat assessment values include at least information pertaining to one or more users;
   operating a content management system (CMS) that tracks user-initiated content object interaction events;
   generating a further threat assessment value at the content management system, wherein the further threat assessment value is determined based at least in part on one of at least one of (A) one or more user-to-user relationships or (B) one or more user-to-file relationships as determined at the content management system; and
   establishing an augmented threat assessment using both the threat assessment values of the STMF with the further threat assessment value from the content management system, wherein the augmented threat assessment is increased if a suspect user has a scheduled termination date.

9. The non-transitory computer readable medium of claim 8, further comprising instructions which, when stored in memory and executed by the one or more processors causes the one or more processors to perform acts of, providing the augmented threat assessment to the STMF.

10. The non-transitory computer readable medium of claim 8, wherein the user-to-user relationships are based on user-to-file interaction events by two or more user devices.

11. The non-transitory computer readable medium of claim 10, wherein at least one of the two or more user devices participates in an anomalous download.

12. The non-transitory computer readable medium of claim 10, wherein the STMF comprises a third-party application, or wherein the STMF comprises a module within the content management system.

13. The non-transitory computer readable medium of claim 8, wherein the STMF is separate from the content management system.

14. The non-transitory computer readable medium of claim 8, wherein the augmented threat assessment is increased if a suspect user is accessing the same files as a user from a different department.

15. A system for augmenting a database of threat assessment values, the system comprising:

a storage medium having stored thereon a sequence of instructions; and one or more processors that execute the sequence of instructions to cause the one or more processors to perform a set of acts, the set of acts comprising, identifying a database of threat assessment values at a security threat management facility (STMF), wherein the threat assessment values include at least information pertaining to one or more users;

operating a content management system (CMS) that tracks user-initiated content object interaction events;

generating a further threat assessment value at the content management system, wherein the further threat assessment value is determined based at least in part on one of at least one of (A) one or more user-to-user relationships or (B) one or more user-to-file relationships as determined at the content management system; and establishing an augmented threat assessment using both the threat assessment values of the STMF with the further threat assessment value from the content management system, wherein the augmented threat assessment is increased if a suspect user has a scheduled termination date.

16. The system of claim 15, further comprising, providing the augmented threat assessment to the STMF.

17. The system of claim 15, wherein the user-to-user relationships are based on user-to-file interaction events by two or more user devices.

18. The system of claim 17, wherein at least one of the two or more user devices participates in an anomalous download.

19. The system of claim 17, wherein the STMF comprises a third-party application, or wherein the STMF comprises a module within the content management system.

20. The system of claim 15, wherein the STMF is separate from the content management system.

* * * * *